United States Patent
Sankaran et al.

(10) Patent No.: US 8,619,788 B1
(45) Date of Patent: Dec. 31, 2013

(54) PERFORMING SCALABLE L2 WHOLESALE SERVICES IN COMPUTER NETWORKS

(75) Inventors: Krishna Sankaran, Milpitas, CA (US); Sanjiv Doshi, San Jose, CA (US); Jagadish Grandhi, Mountain View, CA (US); Apurva Mehta, Cupertino, CA (US); Prakash Kamath, Santa Clara, CA (US); Huaxiang Sun, Sunnyvale, CA (US); Shivaprakash Shenoy, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 348 days.

(21) Appl. No.: 12/901,985

(22) Filed: Oct. 11, 2010

Related U.S. Application Data

(60) Provisional application No. 61/354,461, filed on Jun. 14, 2010.

(51) Int. Cl.
*H04L 12/28* (2006.01)
(52) U.S. Cl.
USPC ....... 370/395.53; 370/392; 370/389; 709/225
(58) Field of Classification Search
USPC .............. 370/218, 389, 392, 395.1, 395.53
See application file for complete search history.

(56) References Cited

U.S. PATENT DOCUMENTS

| | | | |
|---|---|---|---|
| 6,639,901 B1* | 10/2003 | Katzri et al. | 370/255 |
| 7,653,933 B2* | 1/2010 | Miao | 726/4 |
| 7,724,745 B1 | 5/2010 | Elangovan et al. | |
| 7,856,509 B1* | 12/2010 | Kodeboyina | 709/238 |
| 7,856,659 B2* | 12/2010 | Keeler et al. | 726/7 |
| 8,072,984 B2* | 12/2011 | Chang | 370/395.31 |
| 8,121,126 B1* | 2/2012 | Moisand et al. | 370/392 |
| 8,165,156 B1 | 4/2012 | Melsen | |
| 2005/0013295 A1* | 1/2005 | Regan et al. | 370/389 |
| 2006/0098581 A1 | 5/2006 | Kenghe | |
| 2007/0253326 A1* | 11/2007 | Saha et al. | 370/217 |
| 2007/0253432 A1* | 11/2007 | Regale et al. | 370/395.53 |
| 2008/0159309 A1 | 7/2008 | Sultan et al. | |
| 2009/0116505 A1 | 5/2009 | Bhatia et al. | |
| 2009/0122801 A1* | 5/2009 | Chang | 370/395.53 |
| 2009/0141622 A1 | 6/2009 | Bitar | |
| 2009/0205024 A1 | 8/2009 | Kokot et al. | |
| 2009/0285215 A1 | 11/2009 | Kaippallimalil et al. | |

(Continued)

OTHER PUBLICATIONS

Bottorff, "MEF Technical Activities," PPT PowerPoint presentation, Metro Ethernet Forum, IEEE, Mar. 12, 2003, 33 pp.

(Continued)

*Primary Examiner* — Brian O'Connor
(74) *Attorney, Agent, or Firm* — Shumaker & Sieffert, P.A.

(57) ABSTRACT

In general, techniques are described for performing scalable layer two (L2) learning in computer networks. A network device that includes interfaces and a control unit may implement these techniques. The control unit stores a L2 learning table having entries that are each associated with a service tag identifying a service virtual local area network. In response to receiving a packet that includes a service tag, the interfaces access the L2 learning table using the service tag to determine whether any of the entries of the L2 learning table are associated with the service tag. When none of the entries are associated with the service tag, the L2 learning module updates the L2 learning table to create a new entry defining an association between the one of the interfaces that received the packet and the service tag.

32 Claims, 5 Drawing Sheets

(56) References Cited

U.S. PATENT DOCUMENTS

| | | |
|---|---|---|
| 2010/0039934 A1 | 2/2010 | McGuire et al. |
| 2010/0208593 A1 | 8/2010 | Soon et al. |
| 2011/0069711 A1 | 3/2011 | Jha et al. |
| 2012/0106321 A1 | 5/2012 | Alon et al. |

OTHER PUBLICATIONS

Bottorff et al., "Carrier Scale Ethernet: Scaling Provider Ethernet," IEEE Communications Magazine, Sep. 2008, pp. 104-109.

IEEE P802.1ah-2008, "Standard for Local and Metropolitan Area Networks—Virtual Bridged Local Area Networks—Amendment 6: Provider Backbone Bridges," Institute of Electrical and Electronics Engineers, Inc., Mar. 26, 2008, 116 pp.

"Metro Ethernet," Wikipedia, last updated Sep. 17, 2010, 6 pp., http://en.wikipedia.org/wiki/Metro_Ethernet.

Sultan, Huawei Technologies, Inc., "PBBN in the Data Center," presented at the IEEE 802.1 Interim Meeting, Pittsburgh, PA, May 18-21, 2009, 3 pp.

U.S. Appl. No. 12/771,451, by Sanjiv Doshi, filed Apr. 30, 2010.

U.S. Appl. No. 12/827,464, by Sanjiv Doshi, filed Jun. 30, 2010.

Office Action from U.S. Appl. No. 13/197,506, dated Mar. 14, 2013, 14 pp.

\* cited by examiner

PERFORMING SCALABLE L2 WHOLESALE SERVICES IN COMPUTER NETWORKS

This application claims the benefit of U.S. Provisional Application No. 61/354,461, filed Jun. 14, 2010, the entire content of which is incorporated by reference herein.

TECHNICAL FIELD

The invention relates to electronic computer networks and, more specifically, to layer two (L2) computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 network is an Ethernet network in which end point devices (e.g., servers, printers, computers, etc.) are connected by one or more data link layer devices referred to as Ethernet switches. The Ethernet switches forward Ethernet frames, also referred to as L2 frames, L2 communications or L2 packets, to devices within the network. As the Ethernet switches forward the Ethernet frames, the Ethernet switches learn L2 state information for the L2 network, including media access control (MAC) addresses for the devices within the network and the physical interfaces of the Ethernet switches through which the devices identified by the MAC addresses are reachable. The Ethernet switches store the association between physical interfaces and MAC addresses in learning tables associated with each of their physical interfaces. When forwarding an individual Ethernet frame, an ingress interface of an Ethernet switch typically broadcasts the Ethernet frame to all of the other physical interfaces of the switch unless the Ethernet switch has previously learned the specific physical interface from which the destination MAC address specified in the Ethernet frame is reachable. In this case, the Ethernet switch forwards a single copy of the Ethernet frame out the associated physical interface. While referred to as interfaces in this disclosure, these interfaces are also commonly referred to as "ports."

Recently, network service providers have offered systems that provide L2 connectivity between multiple, geographically separate L2 customer networks. That is, the L2 customer networks may be interconnected by the service provider to provide L2 connectivity as if the L2 customer networks were directly connected. One mechanism by which network service providers provide L2 connectivity to their customers is by utilization of Virtual Local Area Networks (VLANs). VLANs are a generic grouping mechanism for Ethernet frames that allow logical isolation of multiple L2 networks that share the same physical Ethernet interfaces. In other words, a service provider may associate different VLANs with different customers so that L2 traffic and L2 state information for the networks, e.g., MAC addresses, is logically separate for the customers. VLANs allow network switches and other infrastructure of the service provider to multiplex the L2 customer traffic over shared physical Ethernet interfaces. In this way, each VLAN provides a connection between devices assigned to the VLAN, and each of the VLANs may essentially be treated as an independent layer two (L2) network. A device assigned to one VLAN can communicate with other devices on that VLAN but may be unable to communicate with devices on a separate VLAN. Ethernet frames for different VLANs may be correctly forwarded within a network by appending a VLAN tag to the frames to designate the VLAN to which each frame belongs. Network switches within the service provider network forward the Ethernet frames using the MAC addresses and other state information learned for the specific VLAN.

In some networks, such as Metro Ethernet Networks (MEN), the network service provider contracts with a network operator to utilize existing infrastructure, such as copper telephone lines, to deliver data or Internet services to the customers of the network operator. Often, the service provider in this arrangement is referred to as an Internet service provider (ISP). Using the existing network infrastructure owned and operated by the network operator, the ISP provides data or Internet services to which one or more customers of the network operator may subscribe. In this arrangement, the network operator may contract with a number of different ISPs to provide customers of the network operator with a choice of services at competitive prices. This network operator is considered a wholesaler of layer two (L2) connectivity in that the network operator offers L2 connectivity for use by any ISP, where layers in this disclosure refer to layers of the Open Systems Interconnection (OSI) model.

While this arrangement between network operator and ISPs benefits the customers of the network operator in terms of competitive pricing (which increases the network operator's desirability from the customer perspective), such an arrangement often results in complications. For example, complications often arise when ISPs attempt to provide new L2 connectivity services in that these services do not scale well to accommodate the typically large number of customers of a network operator. For example, so called "E-LINE" service, also known as Virtual Leased Line (VLL) or Ethernet Private Wire Service (EPVS), provides point-to-point (P2P) connectivity. "E-LAN" service, also known as Virtual Private LAN Services (VPLS) and Transparent LAN Services, provides multipoint-to-multipoint (MP2MP) connectivity in which there is no communication restriction between devices. A third type of metro Ethernet service, referred to as "E-TREE" service, has recently been defined in which Ethernet communication is constrained to point-to-multipoint (P2MP). Often, the lack of scalability occurs because of limitations of network devices owned and operated by the network operator rather than the ISPs. The inability of the network operator to successfully enable these ISPs to provide these new services may reduce the number of ISPs willing to provide services for that network operator and drive customers to a competing network operator that can provide these services.

SUMMARY

In general, techniques are described that facilitate scalable wholesale layer two (L2) connectivity between customers and service providers. These techniques address the manner in which network switches and other infrastructure devices of the network operator learn L2 state information, including MAC addresses, for VLANs traversing the wholesale L2 network. Moreover, the techniques address the manner in which the network switches perform L2 forwarding functions with respect to L2 communications carried by the VLANs. In particular, this disclosure describes techniques by which the network devices perform L2 learning and forwarding in a manner that is independent of the MAC addresses of the customers serviced by the wholesale L2 network. For example, devices within the service provider network may dynamically associate customer VPLS instances with VLAN-based logical interfaces serviced by the switch. Upstream aggregation routers switch the L2 customer traffic into a core of the wholesale L2 network (e.g., an MPLS core network) based only on the VLAN tags carried by the packets without regard to the MAC address of the packets. In this way, unlike conventional L2 networks, MAC address information for the multitude of customer devices need not be learned and maintained for each VLAN by the upstream aggregation routers that bridge the VLAN traffic into a core of the operator's L2 network for transport to various ISPs. Moreover, interface routers further upstream that interface with ISP routers forward the L2 traffic between MPLS core network of the operator and the retail networks of the ISP for the packets based only on the VLAN tags without regard to the MAC address of the packets.

In one example, the devices of the network operator maintain L2 tables so that these tables store associations between VLANs and physical interfaces rather than maintaining full state information that specifies all MAC addresses learned for each VLAN for each of the interfaces. As noted above, the VLANs are usually configured within a network of a network operator to virtually separate access nodes, such as a digital subscriber line access multiplexer (DSLAM) or cable modem termination systems (CMTS), and each access node's customer devices from each other. These VLANs are often referred to as service or stack VLANs (SVLANs) to distinguish them from VLANs established for each customer, where these customer VLANs are often abbreviated as CVLANs. Storing associations between the SVLAN and the physical interface without storing MAC addresses for each of the SVLANs may greatly reduce the number of entries in the tables considering that each DSLAM services hundreds if not thousands of individual customer devices. By avoiding normal L2 learning where MAC addresses of the individual customer devices are associated with interfaces, the size of L2 learning tables is greatly reduced, which may greatly improve scalability with respect to L2 connectivity. These techniques may therefore avoid overrunning limits on L2 learning tables, which conventionally presented complications in terms of scalability that limited a network operator's ability to provide scalable L2 connectivity between customer and service providers in the form of new services, such as Ethernet line (ELINE) and Ethernet local area network (ELAN) services.

In one embodiment, a method comprises storing data defining at least one layer two (L2) learning table with an intermediate network device positioned between an aggregation network device and a service provider network device, wherein the at least one L2 learning table includes entries that are each associated with a service tag that identifies a service virtual local area network (SVLAN) and define an association between interfaces of the intermediate network device and the corresponding service tag without storing an association between a L2 address and the interfaces of the intermediate network device and receiving a packet from the aggregation network device with one of the interfaces of the intermediate network device, wherein the packet includes a service tag identifying an SVLAN. The method also comprises accessing the at least one L2 learning table using the service tag included within the received packet to determine whether any one of the entries of the at least one L2 learning table is associated with the service tag included within the received packet and based on the determination that none of the entries of the at least one L2 learning table are associated with the service tag included within the received packet, updating the at least one L2 learning table to create a new entry that is associated with the service tag included within the received packet and define an association between the one of the interfaces of the intermediate network device that received the packet and the service tag included within the received packet without storing an association between a L2 address included within the received packet and the interfaces of the intermediate network device.

In another embodiment, an intermediate network device positioned between an aggregation network device and a service provider network device, the intermediate network device comprises a plurality of interfaces and a control unit that stores data defining at least one layer two (L2) learning table, wherein the at least one L2 learning table includes entries that are each associated with a service tag that identifies a service virtual local area network (SVLAN) and define an association between the plurality of interfaces and the corresponding service tag without storing an association between a L2 address and the plurality of interfaces. One of the plurality of interfaces receives a packet from the aggregation network device, wherein the packet includes a service tag identifying an SVLAN. Each of the plurality of interfaces is associated with one or more L2 learning modules executing on the intermediate network device. One of the one or more L2 learning modules associated with the one of the plurality of interfaces that received the packet from the aggregation network device accesses the at least one L2 learning table using the service tag included within the received packet to determine whether any one of the entries of the at least one L2 learning table is associated with the service tag included within the received packet and, based on the determination that none of the entries of the at least one L2 learning table are associated with the service tag included within the received packet, updating the at least one L2 learning table to create a new entry that is associated with the service tag included within the received packet and define an association between the one of the plurality of interfaces of the intermediate network device that received the packet and the service tag included within the received packet without storing an association between a L2 address included within the received packet and the interfaces of the intermediate network device.

In another embodiment, a method comprises storing data defining at least one layer two (L2) learning table with an intermediate aggregation network device positioned between an access network device and a layer three (L3) network device, wherein the at least one L2 learning table includes entries that are each associated with a service tag that identifies a service virtual local area network (SVLAN) and define an association between interfaces of the intermediate aggregation network device and the corresponding service tag without storing an association between a L2 address and the interfaces of the intermediate aggregation network device and receiving a packet from the access network device network device with one of the interfaces of the intermediate aggregation network device, wherein the packet includes both the service tag identifying an SVLAN and a customer tag identifying a customer virtual local area network (CVLAN). The method also comprises accessing the at least one L2 learning table using both the service tag and the customer tag to determine whether any one of the entries of the at least one L2 learning table is associated with the service tag and the customer tag included within the received packet and, based on the determination that none of the entries of the at least one L2 learning table are associated with both the service tag and the customer tag included within the received packet, updating the at least one L2 learning table to create a new entry that is associated with the service tag and the customer tag included within the received packet and define an association between the one of the interfaces of the intermediate aggregation network device that received the packet and the service tag and the customer tag included within the received packet without storing an association between a L2 address included within the received packet and the interfaces of the intermediate network device.

In another embodiment, an intermediate aggregation network device positioned between an access network device and a layer three (L3) network device, the intermediate aggregation network device comprises a plurality of interfaces; and a control unit that stores data defining at least one layer two (L2) learning table, wherein the at least one L2 learning table includes entries that are each associated with a service tag that identifies a service virtual local area network (SVLAN) and define an association between the plurality of interfaces and the corresponding service tag without storing an association between a L2 address and the plurality of interfaces. One of the plurality of interfaces receives a packet from the access network device, wherein the packet includes both the service tag identifying an SVLAN and a customer tag identifying a customer virtual local area network (CVLAN). Each of the interfaces is associated with one or more L2 learning module executed by the intermediate aggregation network device. One of the L2 learning modules associated with the one of the plurality of interfaces that received the packet from the access network device accesses the at least one L2 learning table using the service tag and the customer tag included within the received packet to determine whether any one of the entries of the at least one L2 learning table is associated with the service tag and the customer tag included within the received packet and, based on the determination that none of the entries of the at least one L2 learning table are associated with the service tag and the customer tag included within the received packet, updating the at least one L2 learning table to create a new entry that is associated with the service tag and the customer tag included within the received packet and define an association between the one of the interfaces of the intermediate aggregation network device that received the packet and the service tag and the customer tag included within the received packet without storing an association between a L2 address included within the received packet and the interfaces of the intermediate network device.

In another embodiment, a non-transitory computer-readable medium comprises instructions that cause one or more processors to store data defining at least one layer two (L2) learning table with an intermediate aggregation network device positioned between an access network device and a layer three (L3) network device, wherein the at least one L2 learning table includes entries that are each associated with a service tag that identifies a service virtual local area network (SVLAN) and define an association between interfaces of the intermediate aggregation network device and the corresponding service tag without storing an association between a L2 address and the interfaces of the intermediate aggregation network device, receive a packet from the access network device network device with one of the interfaces of the intermediate aggregation network device, wherein the packet includes both the service tag identifying an SVLAN and a customer tag identifying a customer virtual local area network (CVLAN), access the at least one L2 learning table using both the service tag and the customer tag to determine whether any one of the entries of the at least one L2 learning table is associated with the service tag and the customer tag included within the received packet, and based on the determination that none of the entries of the at least one L2 learning table are associated with both the service tag and the customer tag included within the received packet, update the at least one L2 learning table to create a new entry that is associated with the service tag and the customer tag included within the received packet and define an association between the one of the interfaces of the intermediate aggregation network device that received the packet and the service tag and the customer tag included within the received packet without storing an association between a L2 address included within the received packet and the interfaces of the intermediate network device.

In another embodiment, a network system comprises a customer virtual local area network (CVLAN) that includes at least one customer network device, wherein the CVLAN is identified by a customer tag, and a service virtual local area network (SVLAN) that includes an access network device, wherein the SVLAN is identified by a service tag, and a core network. The core network includes an aggregation router and a router. The network system also includes at least one service provider network that includes a service provider router. The router is positioned intermediately between the service provider router and the aggregation router. The router includes a plurality of interfaces and a control unit that stores data defining at least one layer two (L2) learning table, wherein the at least one L2 learning table includes entries that are each associated with a service tag that identifies an SVLAN and define an association between interfaces of the intermediate network device and the corresponding service tag without storing an association between a L2 address and the plurality of interfaces. One of the plurality of interfaces receives a packet from the aggregation router, wherein the packet includes the service tag identifying the SVLAN. Each of the interfaces is associated with one or more L2 learning modules. One of the L2 learning modules associated with the one of the plurality of interfaces that received the packet from the aggregation router accesses the at least one L2 learning table using the service tag included within the received packet to determine whether any one of the entries of the at least one L2 learning table is associated with the service tag included within the received packet and, based on the determination that none of the entries of the at least one L2 learning table are associated with the service tag included within the received packet, updating the at least one L2 learning table to create a new entry that is associated with the service tag included within the received packet and define an association between the one of the interfaces of the router that received the packet and the service tag included within the received packet without storing an association between a L2 address included within the received packet and the interfaces of the intermediate network device.

In another embodiment, a network system comprises a customer virtual local area network (CVLAN) that includes at least one customer network device, wherein the CVLAN is identified by a customer tag, a service virtual local area network (SVLAN) that includes an access network device, wherein the SVLAN is identified by a service tag and a core network. The core network includes an aggregation router and a router. The core network also includes at least one service provider network. The service provider network includes a service provider router. The aggregation router is intermediately positioned between the access network device and the router. The aggregation router comprises a plurality of interfaces and a control unit that stores data defining at least one layer two (L2) learning table, wherein the at least one L2 learning table includes entries that are each associated with a service tag that identifies a SVLAN and a customer tag that identifies a CVLAN and define an association between the plurality of interfaces and the corresponding service tag without storing an association between a L2 address and the plurality of interfaces. One of the plurality of interfaces receives a packet from the access network device, wherein the packet includes both the service tag identifying an SVLAN and a customer tag identifying a CVLAN. Each of the interfaces is associated with one or more L2 learning module executed by the intermediate aggregation network device. One of the L2 learning modules associated with the one of the plurality of interfaces that received the packet from the access network device accesses the at least one L2 learning table using the service tag and the customer tag included within the received packet to determine whether any one of the entries of the at least one L2 learning table is associated with the service tag and the customer tag included within the received packet and, based on the determination that none of the entries of the at least one L2 learning table are associated with the service tag and the customer tag included within the received packet, updating the at least one L2 learning table to create a new entry that is associated with the service tag and the customer tag included within the received packet and define an association between the one of the interfaces of the intermediate aggregation network device that received the packet and the service tag and the customer tag included within the received packet without storing an association between a L2 address included within the received packet and the interfaces of the intermediate network device.

The details of one or more embodiments of the techniques described in this disclosure are set forth in the accompanying drawings and the description below. Other features, objects, and advantages of these techniques will be apparent from the description and drawings, and from the claims.

DETAILED DESCRIPTION

Figure 1:
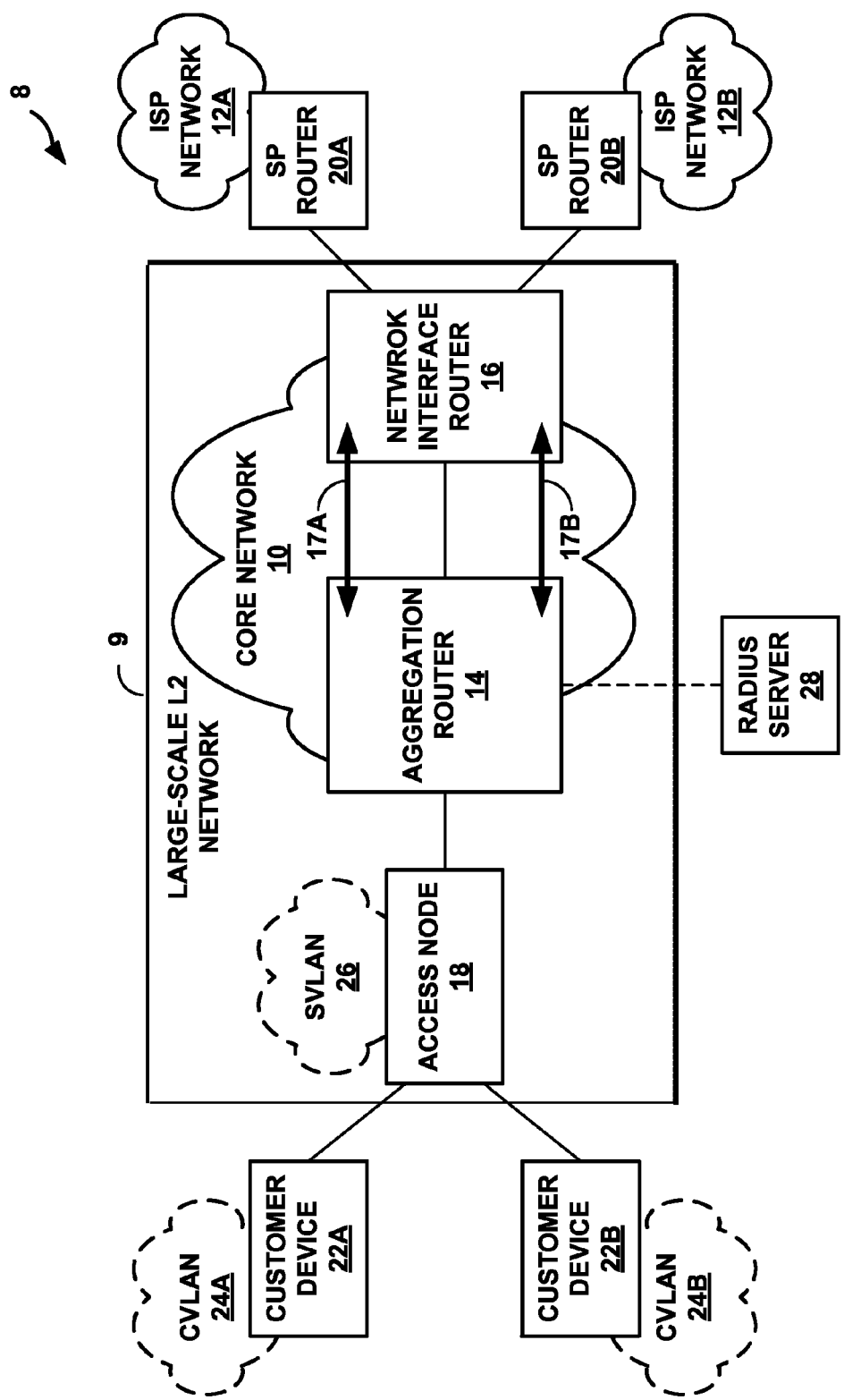
FIG. 1 is a block diagram illustrating an example of a network system that implements the techniques described in this disclosure.

FIG. 1 is a block diagram illustrating an example of a network system 8 that implements the techniques described in this disclosure. In the example of FIG. 1, network system 8 includes a large-scale L2 network 9, such as a metropolitan Ethernet network, and a plurality of Internet service provider (ISP) networks 12A, 12B ("ISP networks 12") that provide services to customers of the L2 network. In the example, embodiment, L2 network 9 includes an access node 18, an aggregation router 14 and a core network 10, which generally represents a multiprotocol label switching (MPLS) network that implements one or more of a suite of MPLS protocols, such as a Resource Reservation Protocol (RSVP) and a Label Distribution Protocol (LDP). Core network 10 implements one of the MPLS protocols to provision label switched paths (LSPs). Often, core network 10 is a layer three (L3) network that implements a L3 protocol, such as an Internet Protocol (IP). In this L3 network, the LSPs represent L2 paths or tunnels through the L3 network represented by core network 10.

Aggregation router 14 represents a network device that may implement L2 switching functionality as well as the one or more MPLS protocols noted above and L3 network protocols, such as IP. When implementing one or more of these MPLS protocols, aggregation router 14 may be characterized as a label switching router (LSR). Aggregation router 14 is generally referred to as an aggregation router because it aggregates traffic forwarded by a plurality of access nodes, such as access node 18 shown in the example of FIG. 1. While only one access node 18 is shown in the example of FIG. 1, aggregation router 14 may couple to a plurality of access nodes similar to access node 18 and aggregate L2 customer traffic forwarded by the plurality of access nodes for delivery into core network 10. Network interface router 16 provides an egress from core network 10 and represents a network-to-network interface (NNI) provider edge (PE) router that provides an interface between core network 10 and ISP networks 12.

Throughout core network 10, one or more pseudowires (PWs) may be defined to interconnect aggregation router 14 and network interface router 16. Generally, a PW represents a bidirectional path that emulates a service not natively supported by the underlying network. For example, assuming core network 10 represents a L3 network, a PW may be provisioned to emulate certain types of L2 connectivity (e.g., L2 Ethernet connectivity) despite that this L3 network may not natively support this form of L2 connectivity. In the example of FIG. 1, two PWs 17A, 17B ("PWs 17") have been provisioned to emulate L2 Ethernet connectivity between aggregation router 14 and network interface router 16. Each of PWs 17 may be associated with a different one of ISP networks 12, where, to facilitate discussion, it is assumed that PW 17A is associated with ISP network 12A and PW 17B is associated with ISP network 12B. Often, PWs 17 are assigned or associated with an ISP to enable ISP networks 12 access to particular customers of a network operator that operates an operator network, which comprises core network 10 and access node 18 in the example of FIG. 1. The network operator may provision these PWs 17 in a manner such that ISP networks 12 may individually identify customer networks, as described below in more detail.

ISP networks 12 each represents a network owned and operated by a different ISP. Typically, ISP networks 12 each represent L3 networks that implement a L3 protocol, such as the above noted IP, to forward data units referred to as packets from source devices to destination devices. ISP networks 12 may each form a part of a public network, such as the Internet, that is publically accessible. Each of ISPs 12 includes SP routers 20A, 20B ("SP routers 20"), respectively. Each of SP routers 20 represents a L3 network device that implements a L3 protocol, such as IP, to route the above mentioned packets throughout their respective ISP networks 12. While each of SP routers 20 represents L3 network devices, SP routers 20 may each also provide or otherwise implement L2 switching functionality so as to provide L2 services to customers in the manner described below in more detail.

As further shown in the example of FIG. 1, network system 8 also includes at least one access node in the form of access node 18 and customer devices 22A, 22B ("customer devices 22"). Access node 18 represents a network device (such as a digital subscriber line access modem (DSLAM) or a cable modem termination system (CMTS)) that aggregates network traffic originated by customer devices 22 for delivery upstream to aggregation router 14. Access node 18 generally implements L2 switching functionality to facilitate the delivery of traffic to and from customer devices 22. Customer devices 22 represent devices owned and operated by different customers of a network operator that owns and operates core network 10 as well as the access network in which access node 18 resides, where the aggregation network is not explicitly shown in the example of FIG. 1 for ease of illustration purposes. Example customer devices 22 include a desktop computer, a laptop computer, a workstation, a computing device referred to as a "netbook," a cellular phone (including so-called "smart phones"), a server, a set-top box (STB), an Internet enabled television, an Voice over Internet Protocol (VoIP) phone, or any other device capable of accessing a L2 network.

As noted above, a single network operator owns and operates L2 network 9 including core network 10, aggregation router 14 and network interface router 16, as well as, access node 18. The network operator may configure and operate this network as a metropolitan Ethernet network (MEN) to provide L2 connectivity between various customers and ISP networks 12. By limiting responsibility to L2 connectivity, the network operator reduces administrative burdens in that connectivity failures in layers higher than layer two are the responsibility of the ISPs. Consequently, many network operators are migrating to this network topology and configuration whereby the network operator need only deliver and then demonstrate, in instances of network failure, L2 connectivity.

Certain L2 services provided by the ISPs require L2 connectivity between different L2 customer networks that are located in geographically separate locations. To enable ISPs to provide these services, the network operation may virtually segregate the operator network by utilizing virtual local area networks (VLANs). The network operator may assign each customer network in which respective customer devices 22 reside a customer VLAN (CVLAN). In the example of FIG. 1, VLANs are generally denoted as dashed-lined clouds, where customer device 22A resides in CVLAN 24A and customer device 22B resides in CVLAN 24B. By assigning each customer network a different CVLAN 24A, 24B ("CVLANs 24"), the network operator may enable ISPs to uniquely identify and distinguish between the different customer networks in which customer devices 22 reside. Given that each customer network may be uniquely identified, the network operator can provision L2 connectivity between any two or more of the uniquely identified customer networks and thereby provide the services that rely on such connectivity.

To provision this L2 connectivity, the operator network, which again is represented by core network 10 and the aggregation network in the example of FIG. 1, may also be segregated into what are referred to as service or stack VLAN (SVLANs). In the example of FIG. 1, access node 18 is assigned to SVLAN 26 in the example of FIG. 1. SVLAN 26 is assigned to access node 18 to segregate access node 18 from other access nodes 18 that do not participate in delivery of that service. Moreover, SVLAN 26 is associated with one or more CVLANs 24 depending on the particular type of service provided by the ISPs.

For example, a new type of point-to-point Ethernet service referred to as an Ethernet line (ELINE) service enables a form of point-to-point L2 connectivity between two different and often geographically separate customer networks. Assuming the customer that owns and operates customer device 22A has subscribed to this ELINE service that is provided by the ISP that owns and operates ISP network 12A to connect to another customer network accessible by ISP network 12A, the network operator provisions SVLAN 26 to segregate CVLAN 24A from the other CVLANs coupled to the operator network, including the CVLAN 24B in which customer device 22B resides. Given this SVLAN 26 that assures dedicated L2 connectivity between CVLAN 24A and the CVLAN accessible from SP network 12A, ISP network 12A may then provision or otherwise configure an ELINE service for this SVLAN 26. Using this ELINE service, customer device 22A may communicate with the other customer devices of the remote CVLAN also associated with SVLAN 26 such that from the perspective of customer device 22A or any other device within CVLAN 24A it appears as if customer device 22A and the remote customer device are directly connected via an Ethernet network. In any event, the network operator may provision, establish or otherwise configure multiple SVLANs, such as SVLAN 26, to enable the delivery of these types of L2 services by ISPs to customer devices 22.

Conventionally, L2 networks switch Ethernet frames, which are an example of a L2 packet or a L2 data unit, rather than route data units as is the case in L3 networks. Each device of a L2 network that implements L2 switching, including access node 18, aggregation router 14 and network interface router 16, discover or otherwise learn how to switch these L2 packets during the normal course of receiving and switching traffic. To illustrate, assume that customer device 22A originates and sends a L2 packet upstream to access node 18, where this L2 packet includes a source L2 address referred to as a source media access control (MAC) address that uniquely identifies the sender of the packet and a destination L2 address referred to as a destination MAC address that uniquely identifies the destination to which the packet is directed. Access node 18 stores data defining a L2 learning table that includes entries associating a unique L2 address referred to as a media access control (MAC) address with interfaces or physical ports of access node 18. Access node 18 receives this L2 packet via one of its interfaces and parses the source MAC address of the L2 packet that uniquely identifies customer device 22A. Using this parsed MAC address as a key, access node 18 performs a lookup in the L2 learning table. If access node 18 has not yet learned or discovered this source L2 address, access node 18 creates an entry in the L2 learning table that associates the L2 source address with the interface over which aggregation node 18 received this L2 packet, thereby effectively learning or discovering the location of customer device 22A with respect to the interfaces of access node 18.

To switch this L2 packet from customer device 22A, access node 18 parses the destination L2 address from the packet and performs a lookup in the L2 learning table to identify one of its interfaces or physical ports to which it should switch the received L2 packet. If access node 18 has not yet learned of this destination address in the manner described above, or in other words, the lookup returns a null entry, access node 18 broadcasts this packet via all of its interfaces except for the one over which it received the L2 packet. However, if access node 18 has previously learned of this destination L2 address, access node 18 switches the packet to the interface identified in the located entry of the L2 learning table, whereupon this interface proceeds to forward the L2 packet on to the destination device.

In the context of L2 wholesale, the general learning outlined above is modified slightly in that learning occurs only with respect to a given VLAN, or more particularly, a give VLAN tag that identifies the VLAN. To illustrate, consider the example above where the customer network in which customer device 22A resides is associated with SVLAN 26 in order to deliver a point-to-point ELINE service. In this example, access node 18 learns only within the context of SVLAN 26 and stores data defining a separate L2 learning table solely for use in learning the location of customer devices associated with customer networks identified as belonging to SVLAN 26. In this manner, L2 learning proceeds as outlined above in the limited context of SVLAN 26.

The L2 learning described above is also performed by each L2 device in the network, including aggregation router 14 and network interface router 16. While access node 18 may be required to learn within the context of SVLAN 26 and thereby limit the number of entries in its L2 learning table to the number of devices included within of SVLAN 26, the number of devices accessible from each device increases the further upstream toward ISP networks 12 any given device is positioned. In other words, as traffic is aggregated first by access node 18 and then by aggregation router 14, the number of devices that originate this traffic increases, which directly impacts the number of source L2 MAC addresses each successive upstream device must learn or discover and store to a L2 learning table.

For example, in large operator networks, aggregation router 14 may couple to a number of different access nodes similar to access node 18, where each of these access nodes may service a number of large customer networks. Network interface router 16 may further couple to a number of different aggregation routers similar to aggregation router 14. At each level in this aggregation network, traffic is aggregated and sent upstream to another device. Access node 18 may have to learn of potentially thousands of L2 addresses, while aggregation router 14 may couple to a number of access nodes, such as a few tens of access nodes, each of which provides access to thousands of customer devices, meaning that aggregation router 14 is required to learn tens of thousands of L2 addresses. Meanwhile, network interface router 16 couples to potentially tens of aggregation routers, each of which provides access to potentially tens of thousands of customer devices, meaning network interface router 16 may be required to learn of potentially hundreds of thousands or possibly millions of L2 addresses.

As the Ethernet protocol was generally employed in private networks that are generally much smaller in terms of the number of customer devices than a public network such as the Internet, many network devices, such as network interface router 16, only provide for limited space to store data defining L2 learning tables. Often, this space is limited because L2 learning occurs in what is referred to as a data path of these devices, which is usually implemented predominately as dedicated hardware units, such as field programmable gate arrays (FPGAs) and application-specific integrated circuits (ASICs), that are specifically designed to provide for efficient switching of L2 packets and routing of L3 packets. As L2 Ethernet connectivity has expanded in application to include new services, such as the ELINE service mentioned above, a point-to-multipoint Ethernet tree (ETREE) service and a multipoint-to-multipoint Ethernet large area network (ELAN) service, the number of L2 addresses an upstream device has been required to learn has grown significantly to the point where these devices, such as network interface router 16, do not provide sufficient memory within the dedicated hardware units to store the L2 learning tables of sufficient size to learn all of these addresses. As a result, these devices may be unable to learn all of the addresses, which may cause these devices to fail or act erratically. For example, network interface router 16, upon overrunning its storage space allocated for storing its L2 learning tables, may begin broadcasting packets via all of its interfaces except for the interface over which the packet was received despite having received a packet from this device before. Network interface router 16 may, in this instance, be unable to learn addresses and for these addresses it cannot learn, repeatedly send these packets via broadcast. Broadcasting packets consumes significant bandwidth and other network resources, which may impact if not prevent delivery of services by ISP networks 12.

In accordance with the techniques of this disclosure, network interface router 16 performs a form of modified L2 learning, where instead of learning based on source L2 addresses, network interface router 16 may learn using SVLANs only. That is, network interface router 16 stores associations between an SVLAN and the access node that is both associated with this SVLAN and from which the network interface router 16 receives packets without storing any L2 addresses and associations between these L2 addresses and an interface. To illustrate, assume that network interface router 16, which is representative of an upstream intermediate device positioned between aggregation router 14 and service provider routers 20. This learning table includes entries that are each associated with a different service label, such as an SVLAN tag, that respectively identifies different SVLANs and defines an association between interfaces of the intermediate network device and the corresponding SVLAN tag. As described in more detail below, by storing associations between SVLANs and interfaces rather than source L2 MAC addresses and interfaces, network interface router 16 may greatly reduce the number of entries in the L2 learning table and avoid overrunning or exceeding the limited storage space provided in the dedicated hardware that implements the data path. In this respect, the techniques may facilitate scalability as network interface router 16 may enable L2 connectivity for a large number of SVLANs comprising potentially thousands of customers without entering what may be referred to as an overload condition.

To illustrate how this overload condition may be reduced or mitigated entirely, assume customer device 22A originates and sends a L2 packet that includes a source L2 MAC address uniquely identifying customer device 22A and a L2 MAC address uniquely identifying a customer device positioned in a CVLAN accessible from ISP network 12A. Customer device 22A inserts a CVLAN tag that uniquely identifies CVLAN 24A into the packet and transmits the L2 packet to access node 18. As noted above, the network operator has previously provisioned access node 18 to associate CVLAN 24A with SVLAN 26. SVLAN 26 has also been associated by the network operator with ISP network 12A. Access node 18 receives this L2 packet and parses this L2 packet to determine the CVLAN tag inserted by customer device 22A and which identifies this L2 packet as originating from CVLAN 24A. Access node 18 performs a lookup in its VLAN configuration information to determine that SVLAN 26 is associated with CVLAN 24A, whereupon access node 18 inserts an SVLAN tag that associates the received L2 packet with SVLAN 26.

Access node 18 also parses the source L2 MAC address from the received L2 packet and performs learning as outlined above to determine whether or not access node 18 has previously learned of this L2 MAC address within the logical domain represented by the SVLAN tag. Assuming access node 18 has not previously learned of this L2 MAC address for this particular SVLAN 26, access node 18 would conventionally learn this address in the manner described above. Access node 18 further parses the received L2 packet to determine the destination L2 MAC address and performs a lookup in the L2 learning table associated with identified SVLAN 26 to determine one of its interfaces to which it should switch the received L2 packet. Assuming access node 18 has already learned of this destination L2 MAC address, access node 18 would conventionally retrieve an entry from the L2 learning tables associated with SVLAN 26 and switches this L2 packet to the interface identified by the retrieved entry. This interface outputs the L2 packet that has been modified to include the SVLAN tag identifying SVLAN 26 to aggregation router 14. Access node 18 typically does not implement the modified L2 learning techqniues described in this disclosure as it generally manages connectivity for a relatively few customer devices when compared to devices that reside further upstream, such as aggregation router 15 and network interface router 16.

When aggregation router 14 receives a packet from the access node 18, it determines whether it has learned the CVLAN/SVLAN tag combination specified in the L2 packet. Aggregation router 14 may store data defining a table that associates CVLAN/SVLAN tags with PWs 17, which effectively associates CVLAN/SVLANs with one of ISP networks 12 to which the corresponding customer has subscribed considering that PWs 17 are statically configured to a single one of ISP networks 12. Aggregation router 14 parses the CVLAN/SVLAN tags stored to this L2 packet and uses this CVLAN/SVLAN tag combination as an index into the table. If an entry is defined for this CVLAN/SVLAN tag combination, aggregation router 14 assumes that this CVLAN/SVLAN combination has been previously authenticated and forwards the L2 packet via the one of PWs 17 specified by the entry. If no entry is defined, aggregation router 14 authenticates the user based on information stored in the packet, such as the source L2 MAC address, as well as, any other authentication information provided in the packet.

As shown in the example of FIG. 1, aggregation router 14 may couple to a Remote Access Dial-In User Service (RADIUS) server 28 that implements a RADIUS protocol for performing authentication, authorization and accounting. RADIUS server 28 may store data defining certain provisioning information for CVLANs 24, such as an association between CVLANs 24 and ISP networks 12. Aggregation router 14 interfaces with RADIUS server 28 to determine whether CVLAN 24A is authorized to access core network 10, providing RADIUS server 28 with the authentication information provided by customer device 22A of CVLAN 24A via the packet. Assuming authorization is provided by RADIUS server 28, such authorization includes data defining an association between CVLAN 24A and one of PWs 17, which as noted above have been configured to be associated with one of ISP networks 12. In this example, the authorization information associates the combination of the CVLAN tag identifying CVLAN 24A and the SVLAN tag identifying SVLAN 26 with PW 17A. Aggregation router 14 then switches the received packet to the interface that couples to PW 17A, whereupon this interface of aggregation router 14 associates the parsed SVLAN tag with PW 17A in its L2 learning table associated with the SVLAN tag identifying SVLAN 26. Aggregation router 14 then forwards the received packet via PW 17A to network interface router 16, where such forwarding generally involves appending one or more MPLS labels to the received packet that identify the received packet as corresponding to PW 17A.

Network interface router 16 receives this L2 packet from aggregation router 14 with one of its interfaces of the intermediate network device via PW 17A. Again, this packet includes an SVLAN tag that identifies this packet as corresponding to SVLAN 26 and a CVLAN tag identifying CVLAN 24A reachable from aggregation router 14. Network interface router 16 then implements the techniques described in this disclosure to parse the SVLAN tag from the received L2 packet, which network interface router 16 uses as a key to access the above noted L2 learning table to determine whether any one of the entries of the learning table is associated with the SVLAN tag included within the received packet. Assuming network interface router 16 has not previously learned of this SVLAN tag associated with SVLAN 26, network interface router 16 determines that none of the entries in the learning table are associated with SVLAN tag included within the received packet. In response to this determination, network interface router 16 updates the learning table to create a new entry and associates this new entry with the SVLAN tag associated with SVLAN 26. Network interface router 16 then defines an association within this entry that associates the one of the interfaces of network interface router 16 that received this L2 packet and the SVLAN tag included within the received L2 packet.

In this respect, network interface router 16 performs a form of modified L2 learning to learn or otherwise determine associations between SVLANs and interfaces. Network interface router 16 does not, in this context, learn or otherwise determine associations between source L2 MAC addresses and interfaces. Considering that SVLANs may each include hundreds if not thousands of customer devices, each of which is assigned a different unique L2 MAC address, network interface router 16 avoids learning potentially thousands of L2 MAC addresses by only learning based on SVLAN. As there may be only a hundred or possibly a thousand different SVLANs, network interface router 16 need only store at most those hundred or thousand different entries in its L2 learning table rather than the hundreds of thousands or possibly millions of entries that would be required if network interface router 16 performed conventional L2 learning. Consequently, network interface router 16 avoids overrunning the memory allocated in its data plane for storing L2 learning tables, which facilitates network operation by avoiding failure of network interface router 16 and/or the erratic behavior of repeatedly broadcasting packets. Moreover, because the L2 learning table stored by network interface router 16 is condensed, network interface router 16 may be able to learn potentially tens of thousands of SVLANs, which significantly increases the scalability of network interface router 16, especially with respect to providing a large-scale L2 network over which a variety of different ISP networks 12 can provide L2 services to a multitude of customers.

After performing this modified learning in accordance with the techniques described in this disclosure, network interface router 16 switches this packet to the interface of network interface router 16 that couples to SP router 20A of ISP network 12A. Network interface router 16 may be statically provisioned by the network operator to associate the SVLAN tag identifying SVLAN 26 to this interface. This interface of network interface router 16 then forwards the received packet to SP router 20A, which proceeds to forward this packet to its intended destination in the public network or, if this packet corresponds to one of the ELINE, ETREE or ELAN service, to an member customer network of this service.

As an example of how this form of modified learning is implemented in the downstream direction from network interface router 16 to customer devices 22, consider that a packet from the public network accessible by ISP network 12A may arrive at SP router 20A having an identified destination of customer device 22A. SP router 20A appends the appropriate SVLAN tag that identifies SVLAN 26 and CVLAN tag that identifies CVLAN 24A based on this destination address. SP router 20A forwards this packet to network interface router 16. Upon receiving this packet, network interface router 16 performs a lookup based on the SVLAN tag in its L2 learning table stored by the interface that received the packet. This interface identifies another interface of network interface router 16 (i.e., PW 17A in this example) via the lookup and switches the packet to this interface associated with PW 17A. This interface forwards the packet to aggregation router 14 via PW 17A. The interface of aggregation router 14 associated with PW 17A receives this packet and performs a lookup in its L2 learning tables associated with SVLAN 26 using the SVLAN and CVLAN tags as a key. Aggregation router 14 may also learn in this downstream direction as well and install an association between the SVLAN tag of the received packet and its interface associated with PW 17A that received this packet. Aggregation router 14 switches this packet to the interface determined via the lookup or otherwise broadcasts the packet to all interfaces associated with SVLAN/CVLAN tag combination if a particular interface was not determined. Assuming such an interface was identified via the lookup, aggregation router 14 switches the packet to this interface, which proceeds to forward this packet to access node 18. Access node 18 then forwards this packet to CVLAN 24A popping the SVLAN tag at the ingress interface and transmitting the packet with only the CVLAN tag to CVLAN 24A. The following FIGS. 2A, 2B illustrate the operations performed at each of devices 14, 16 and 18 in more detail.

Figure 2A:
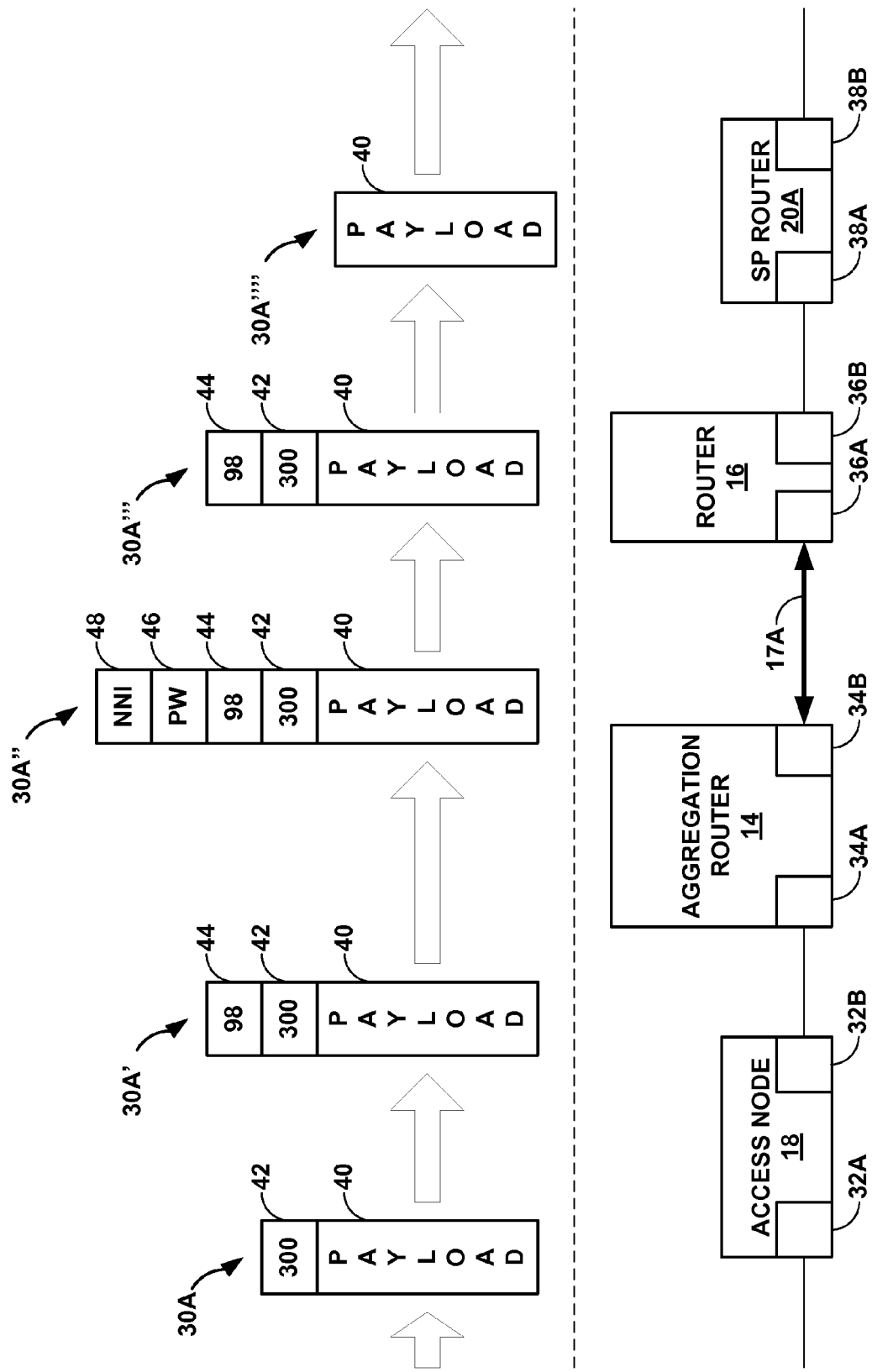
FIGS. 2A, 2B are block diagrams illustrating example operations of the aggregation router and router of FIG. 1 in more detail as these devices switch L2 packets and implement various aspects of the modified L2 learning techniques described in this disclosure.
Figure 2B:
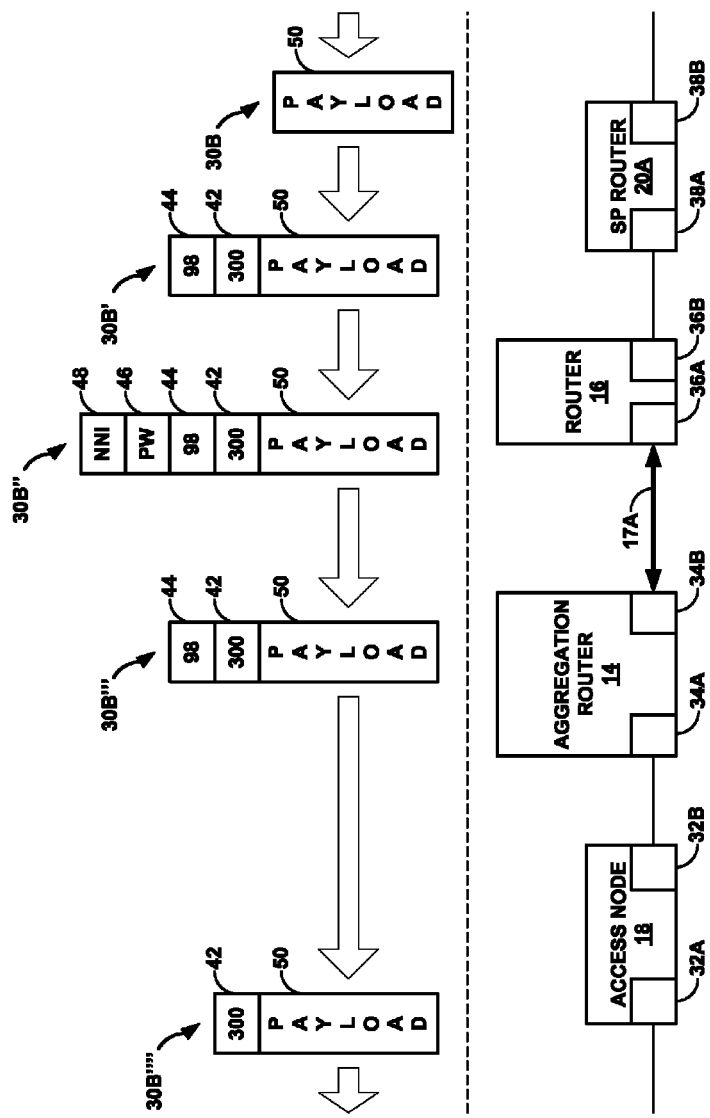

FIGS. 2A, 2B are block diagrams illustrating example operations of aggregation router 14 and network interface router 16 of FIG. 1 in more detail as these devices switch L2 packets 30A, 30B and implement various aspects of the modified L2 learning techniques described in this disclosure. FIG. 2A is a block diagram illustrating example operations of access node 18, aggregation router 14 and network interface router 16 of FIG. 1 in more detail as these devices switch packet 30A upstream from CVLAN 24A identified by a CVLAN tag of 300 to ISP network 12A and implement various aspects of the modified L2 learning techniques described in this disclosure.

In the top half of FIG. 2A, an exemplary L2 packet 30A is shown proceeding from CVLAN 24A identified by a CVLAN tag of 300 upstream to ISP network 12A. Underneath packet 30A, the example of FIG. 2A shows access node 18, aggregation router 14, network interface router 16 and SP router 20A. Access node 18 includes interfaces 32A, 32B, which may also be referred to as ports 32A, 32B. Aggregation router 14 includes interfaces 34A, 34B. Network interface router 16 includes interfaces 36A, 36B, while SP router 20A includes interfaces 38A, 38B. Interface 32A of access node 18 couples to CVLAN 24A and receives packet 30A. As shown on the far left of the top half of FIG. 2A, packet 30A, as received by interface 32A, includes a payload 40 and a CVLAN tag 42 with a value of 300 that identifies CVLAN 24A. Payload 40 represents the data or other information sent to the public network via SP netowrk 12A.

Interface 32A of access node 18 parses CVLAN tag 42 and retrieves a L2 learning table associated with this CVLAN tag 42. While not shown in FIG. 2A, packet 30A also includes a source L2 MAC address and a destination L2 MAC address. Interface 32A performs learning on the source L2 MAC address and updates the L2 learning table associated with CVLAN tag 42 in the manner described above when interface 32A has not previously learned of the source L2 MAC address. Interface 32A also performs a lookup in this L2 learning table associated with CVLAN tag 42 using the destination MAC address as a key. Assuming that interface 32A has previously learned of this destination MAC address, interface 32A identifies interface 32B as associated with the destination MAC address and switches packet 30A to interface 32B. Interface 32B also performs learning in the manner described above with respect to the source L2 MAC address. Interface 32B may have been previously configured to associate packets having a CVLAN tag 42 with a value of 300 to SVLAN 26, which is identified by an SVLAN tag with a value of 98. Interface 32B pushes an SVLAN tag 44 with this value of 98 onto packet 30A to generate packet 30A'. Interface 32B then forwards packet 30A' to interface 34A of aggregation router 14.

Interface 34A of aggregation router 14 receives packet 30A' that includes both SVLAN tag 44 and CVLAN tag 42. Aggregation router 14 may authenticate this user based on authentication information included within packet 30A through a request to RADIUS server 28 in the manner described above. Assuming such authentication is successful or that this user has been previously authenticated and authorization to access core network 10 is granted by RADIUS server 28, such authorization includes data defining an association between CVLAN 24A and one of PWs 17, which as noted above have been configured to be associated with one of ISP networks 12. In this example, the authorization information associates the combination of the CVLAN tag identifying CVLAN 24A, i.e., tag value 300 in this example, and the SVLAN tag identifying SVLAN 26, i.e., SVLAN tag value 98 in this example, with PW 17A. Once authorization is received, interface 34A performs the modified L2 learning techniques described in this disclosure.

While described above as separately learning CVLAN and SVLAN tags, aggregation router 14 may learn on the combination of CLVAN/SVLAN tags. In this instance, aggregation router 14 receives packet 30A' that includes both SVLAN tag 44 and CVLAN tag 42. Aggregation router 14 parses both of CVLAN and SVLAN tags 42, 44, respectively, and stores a table indexed on CVLAN/SVLAN tag combinations. Aggregation router 14 then performs a lookup in this combined table using CVLAN/SVLAN tags 42, 44 as an index into the combined table. Thus, while described in this example as learning separately on CVLAN tags and SVLAN tags, the learning may occur based on CVLAN/SVLAN tag combinations. The techniques should not therefore be limited in this respect.

In accordance with this modified form of L2 learning and forwarding, interface 34A retrieves the L2 learning table and determines whether this interface 34A has previously learned of this SVLAN tag 44. If no entry exists in the L2 learning table (meaning that interface 34A has not yet seen or learned of this SVLAN tag 44), interface 34A updates the L2 learning table to associate the value of SVLAN tag 44, i.e., 98 in this example, with interface 34A. In some instances, interface 34A updates the L2 learning table to associate interface 34A with a combination of both the value of SVLAN tag 44 and CVLAN tag 42. If an entry exists in the L2 learning table that corresponds to the value of SVLAN tag 44 (meaning interface 34A has already learned of this SVLAN 26), interface 34A need not update is L2 learning table in the manner described above.

This modified form of L2 learning may avoid having to learn any source L2 MAC addresses with respect to VLANs as is common in conventional networks. By avoiding conventional L2 learning based on source L2 MAC addresses, interface 34A avoids having to maintain separate L2 learning tables for each VLAN, each of which stores separate entries for each customer associated with that VLAN. Instead, interface 34A need only maintain a single L2 learning table to learn of SVLANs. Interface 34A may utilize CVLAN tag 42 in conjunction with SVLAN tag 44 in order to distinguish one entry from another entry also associated with SVLAN tag 44 having a value of 98, as no two interfaces of the same device may be concurrently associated with an SVLAN tag of the same value. Consequently, interface 34A may utilize the value stored to CVLAN tag 42 to differentiate this entry from entries stored by other interfaces of aggregation router 14, such as interface 34B, which as explained below performs the same form of modified L2 learning, but does not learn based on both the SVLAN/CVLAN tag. Instead, interface 34B utilizes a set or pre-programmed number (which may be configurable by an administrator or other user) in conjunction with the value stored to SVLAN tag 44 so as to differentiate the entry in the L2 learning table from that stored in the L2 learning table of interface 34A.

After performing this modified form of L2 learning, aggregation router 14 then switches received packet 30A' to the interface that couples to PW 17A, which is assumed to be represented by interface 34B. In response to this packet 30A', interface 34B associates parsed SVLAN tag 44 with PW 17A in the L2 learning table associated with SVLAN tag 44 identifying SVLAN 26. Interface 34B appends MPLS labels shown as a pseudowire (PW) label 46 ("PW 46") and network-to-network interface (NNI) label 48 ("NNI 48") to packet 30A' so as to form packet 30A". PW tag 46 identifies PW 17A while NNI tag 48 identifies an NNI used for packet relay. As this L2 packet includes MPLS labels, packet 30A" may also be referred to as an MPLS packet 30A". Interface 34B then forwards packet 30A" via PW 17A to interface 36A of network interface router 16.

Interface 36A of network interface router 16 receives this L2 packet 30A" from aggregation router 14 via PW 17A. Network interface router 16 first removes PW label 46 and NNI label 48 from packet 30A" to form L2 packet 30A"'. Interface 36A of network interface router 16 then implements the techniques described in this disclosure to parse SVLAN tag 44 from L2 packet 30A"', which network interface router 16 uses as a key to access the above noted L2 learning table to determine whether any one of the entries of the learning table is associated with SVLAN tag 44 included within packet 30A"'. Assuming interface 36A has not previously learned of this SVLAN tag associated with SVLAN 26, interface 36A determines that none of the entries in the learning table are associated with SVLAN tag 44 included within packet 30A"'. In response to this determination, interface 36A updates the learning table to create a new entry and associates this new entry with SVLAN tag 44. Interface 36A then defines an association within this entry that associates interface 36A and the value of SVLAN tag 44, i.e., 98 in this example, included within L2 packet 30A"'.

After performing this modified learning in accordance with the techniques described in this disclosure, interface 36A switches this packet to the interface of network interface router 16 that couples to SP router 20A of ISP network 12A, i.e., interface 36B in this example. Network interface router 16 may be statically provisioned by the network operator or administrator to associate the value of SVLAN tag 44 identifying SVLAN 26 to interface 36B. Interface 36B of network interface router 16 then forwards the packet 30A"' to SP router 20A.

FIG. 2B is a block diagram illustrating example operations of access node 18, aggregation router 14 and network interface router 16 of FIG. 1 in more detail as these devices switch packet 30A downstream from ISP network 12A to CVLAN 24A identified by a CVLAN tag of 300 and implement various aspects of the modified L2 learning techniques described in this disclosure. Similar to FIG. 2A, the top half of FIG. 2B shows an exemplary L2 packet 30B as it proceeds from ISP network 12A to CVLAN 24A identified by a CVLAN tag of 300. Underneath packet 50A, the example of FIG. 2B shows access node 18, aggregation router 14, network interface router 16 and SP router 20A in a similar level of detail as that shown in FIG. 2A.

Initially, packet 30B arrives from the public network accessible by ISP network 12A at SP router 20A having an identified destination of customer device 22A in a header of payload 50. SP router 20A appends the appropriate SVLAN tag that identifies SVLAN 26, i.e., SVLAN tag 44 in this example, and CVLAN tag that identifies CVLAN 24A, CVLAN tag 42 in this example, based on this destination address to form packet 30B'. That is, interface 38B receives packet 30B having only payload 50, which refers to a fully formed L2 packet in this example including a L2 header and a L2 payload. The L2 payload may store a L3 packet having a L3 header and a L3 payload, where the L3 header specifies an IP destination address assigned to customer device 22A. Interface 38B may perform a lookup in the L2 learning table based on the L2 destination MAC address specified in the L2 header, where this lookup identifies interface 38A as the interface that provides access to the specified L2 destination MAC address. SP router 30A then switches this packet 30B to interface 38A, which proceeds to form packet 30B' in the manner described above by appending SVLAN tag 44 and CVLAN tag 42. Interface 38A then forwards packet 30B' to network interface router 16, which receives packet 30B' via interface 36B.

Upon receiving this packet, interface 36B performs a lookup in the L2 learning table based on SVLAN tag 44. Interface 36B identifies another interface of network interface router 16 (i.e., interface 36A associated with PW 17A in this example) via the lookup and switches the packet to interface 36A. Interface 36A again performs a lookup in the L2 learning table based on SVLAN tag 44 and determines that SVLAN tag 44 has been previously associated with PW 17A. Interface 36A then appends PW label 46 and NNI label 48 to packet 30B' to form packet 30B". Interface 36A then forwards packet 30B" to aggregation router 14 via PW 17A. Interface 34B of aggregation router 14 associated with PW 17A receives packet 30B' and removes NNI label 48 and PW label 46. Interface 34B then performs a lookup in the L2 learning tables associated with SVLAN 26 using SVLAN tag 44 and CVLAN tag 42 as a key. Interface 34B may also learn in this downstream direction as well and install an association between SVLAN tag 44 of the received packet and interface 34B associated with PW 17A that received packet 30B". Aggregation router 14 switches packet 30B' to the interface determined via the lookup, i.e., interface 34A in this example, or otherwise broadcasts the packet to all interfaces associated with SVLAN/CVLAN tag combination if a particular interface was not determined. Assuming such an interface was identified via the lookup, aggregation router 14 switches the packet to interface 34A, which proceeds to forward this packet 30B"' to access node 18. Interface 32B of access node 18 receives this packet, removes SVLAN tag 44 and performs a lookup in the lookup table based on CVLAN tag 42 and the destination MAC address specified in the L2 header of payload 50. Assuming this lookup identifies interface 32A, access node 18 switches this packet 30B' to interface 32A, which forwards this packet to CVLAN 24A.

Figure 3:
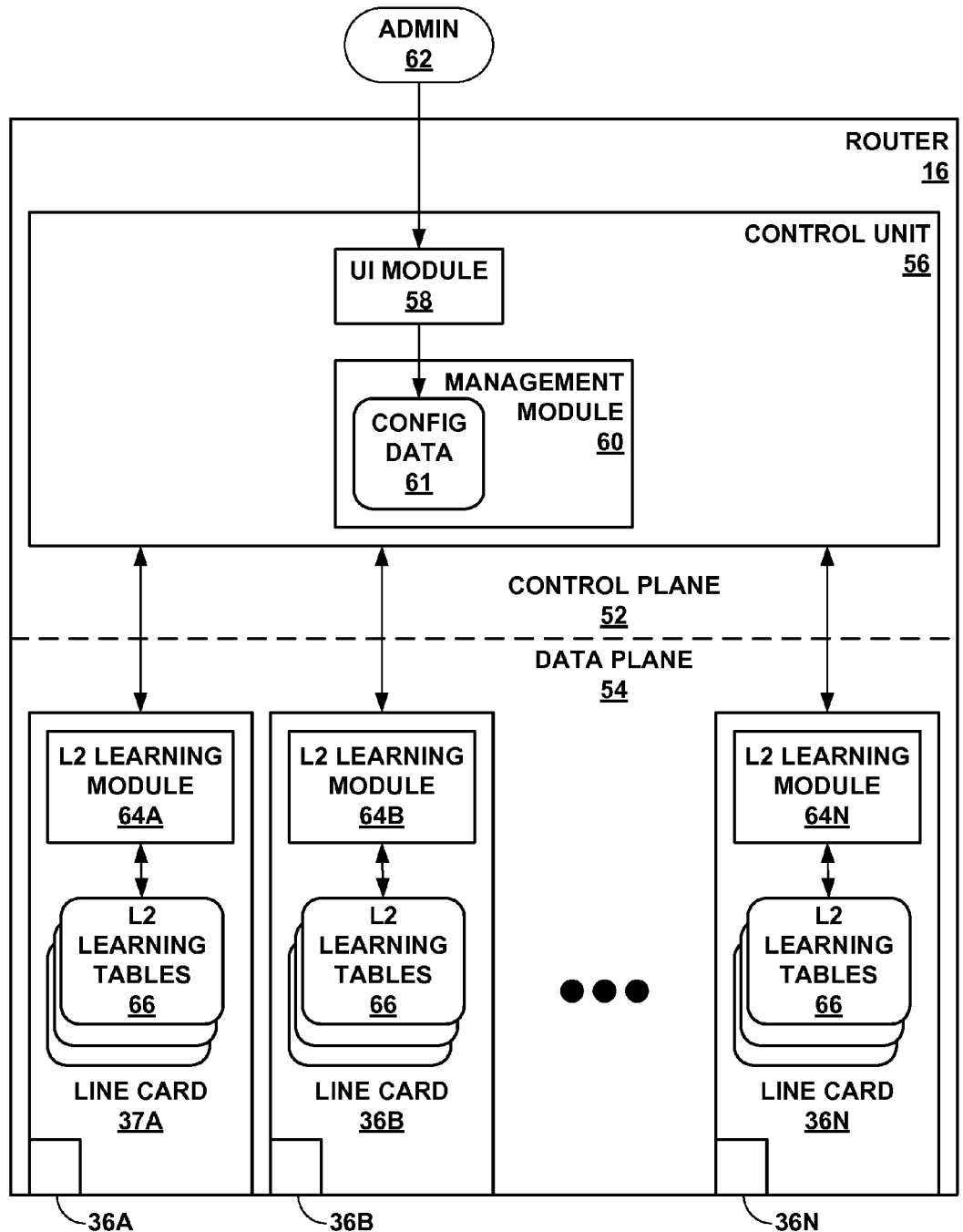
FIG. 3 is a block diagram illustrating the router of FIGS. 1, 2A and 2B in implementing the modified L2 learning techniques described in this disclosure to improve scalability with respect to L2 connectivity.

FIG. 3 is a block diagram illustrating network interface router 16 of FIGS. 1, 2A and 2B in implementing the modified L2 learning techniques described in this disclosure to improve scalability with respect to L2 connectivity. Network interface router 16 generally represents any network device capable of implementing the modified L2 learning techniques of this disclosure. While described below with respect to network interface router 16, the techniques should not be limited to this particular network device but may be implemented by any network device. Moreover, while not described explicitly with respect to aggregation router 14, the techniques of this disclosure may be implemented by aggregation router 14 as noted above.

In the example of FIG. 3, network interface router 16 may be logically segregated into a control plane 52 and a data plane 54. Control plane 52 represents the portion of network interface router 16 dedicated to control of the operations of network interface router 16, including those operations directed to maintaining a state or topology of core network 10, such as executing routing protocols and maintaining a routing information base. Control plane 52 also represents the portion of network interface router 16 dedicated to management of these various operations. Data plane 54 represents the portion of network interface router 16 dedicated to the movement of data, either by way of L3 forwarding or L2 switching.

Control plane 52 includes a control unit 56 that performs these control operations. Control unit 56 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively, control unit 30 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 56 includes a user interface (UI) module 58 ("UI module 58") and a management module 60. User interface module 58 represents a software module that presents user interfaces with which a user, such as administrator 62 ("admin 62"), may interface to interact generally with control unit 56 and, more specifically, management module 60. UI module 58 may present a command line interface (CLI), a graphical-user interface or any other type of interface with which admin 62 may interface to interact with management module 60. Management module 60 represents a software module that manages the various operations of network interface router 16 often by way of configuration data that specifies various configuration parameters with respect to these various operations.

Admin 36 may interface with a user interface presented by UI module 58 to configure data plane 54 to perform this modified form of L2 learning in accordance with the techniques of this disclosure. Admin 36 may specify configuration data 61 ("config data 61") via this user interface, which management module 60 uses to configure data plane 54 in the manner described in more detail below. Often, this configuration data 61 is a script that specifies hierarchical configuration data for configuring various routing or switching instances on a per ISP or SP network 12 basis.

Data plane 54 includes line cards 37A-37N ("line cards 37"). Line cards 37 may each represent a distributed forwarding engine that is configured to switch L2 packets by control unit 56, which may in this instance represent a routing engine. Line cards 37 generally provide logic necessary to perform data plane operations and may support these operations with buffers and other hardware units, such as micro-controllers. In some instances, line cards 37 are implemented in the context of a FPGA, ASIC and/or any other form of dedicated hardware for performing the data plane operations.

In any event, these distributed forwarding engines may be referred to as packet forwarding engines (PFEs). Typically, each of the distributed forwarding engines stores data defining a forwarding information base (FIB), which represents data used to switch or otherwise forward packets. This FIB may include data defining L2 learning tables 66. Generally, line cards 37 communicate with one another to maintain L2 learning tables 66 in a synchronous state. That is, updates by one of line cards 37 to its L2 learning tables 66 are communicated to the remaining ones of line cards 37 so that these remaining ones of line cards 37 may perform substantially similar updates to their respective L2 learning tables 66 in order to synchronize these L2 learning tables 66 to that of the one of line cards 37 that originally performed the update. Line cards 37 comprise interfaces 36A-36N ("interfaces 36"), and L2 learning modules 64A-64N ("L2 learning modules 64"). As noted above, interfaces 36 each typically represents a physical port or point of interconnection to a communication medium, such as a link. Often interfaces 36 are referred to as ports in the context of L2 devices or devices that implement L2 switching. For this reason, interfaces 36 may also be referred to as "ports 36." While shown as including a single one of interfaces 36, each of line cards 37 may include any number of interfaces and the techniques should not be limited in this respect.

Each of L2 learning modules 64 may maintain L2 learning tables 66 in accordance with the modified L2 learning techniques described in this disclosurfe. While shown as including distributed L2 learning modules 64 located in line cards 37, control unit 56 may include portions of data plane 54 that implement a single L2 learning module, where interfaces 36 simply forward all communications to this central L2 learning module after tagging the communications to indicate the particular one of interfaces 36 that received the packet so that the central L2 learning module may properly associate the SVLAN with the corresponding one of interfaces 36 that received the packet. Thus, while the techniques are described with respect to this particular embodiment, the techniques may be implemented in any number of ways and should not be limited in this respect to any one way of implementing L2 learning modules within a network device.

L2 learning table 66 represent a data structure for storing associations between SVLAN tags, such as SVLAN tag 44 shown in the example of FIGS. 2A, 2B, and interfaces on which the packet having the SVLAN tag 44 was received. Generally, a single routing instance or switching instance is associated with a single one of L2 learning tables 66. For example, any given VLAN conventionally requires its own L2 learning table to maintain the logical separation between general L2 traffic and other L2 traffic associated with a different VLAN. In this instance, however, considering that learning is based only on VLANs and not also based on source MAC addresses, the techniques do not require a separate table for each VLAN. Instead, L2 learning tables 66 may correspond to different ISPs. Consequently, the modified form of L2 learning provided by the techniques of this disclosure presents a different level of abstraction, where SVLANs become similar to source MAC addresses and ISPs become similar to VLANs. By moving the level of abstraction up to the VLAN/ISP level rather than the MAC/VLAN level, the techniques may promote scalability by reducing the number of entries required to be stored in L2 learning tables 66.

To illustrate, consider the example described above with respect to FIG. 2A where interface 36A receives packet 30A'''. Learning module 64A parses packet 30A''' to determine PW label 46, which it then uses to access a corresponding one of L2 learning tables 66. That is, L2 learning tables 66 may each be defined for a different PW, which effectively associates each of L2 learning tables 66 with a different ISP as each PW is provisioned for use by a different one of SP networks 12. Learning module 64A then parses packet 30A''' to extract SVLAN tag 44 and uses this SVLAN tag 44 as an index into the corresponding one of L2 learning tables 66. If the lookup does not return an entry, learning module 64A updates this one of L2 learning tables 66 to create a new entry and associates this entry with SVLAN tag 44. L2 learning module 64A also defines an association within this new entry associating SVLAN tag 44 with interface 36A.

In some instances, when performing this lookup in the corresponding one of L2 learning tables 66, L2 learning module 64A extracts both SVLAN tag 44 and CVLAN tag 42 and uses both of these as an index into this corresponding one of L2 learning tables 66. As noted above, management module 60 may configure L2 learning module 64A in accordance with configuration data 61 to perform this form of modified L2 learning described in this disclosure. As part of this configuration, management module 60 may program or otherwise configure L2 learning module 64A to use both SVLAN tag 44 and CVLAN tag 42 as the index into the corresponding one of L2 learning tables 66. Management module 60 may also program or otherwise configure a different one of L2 learning modules 64 to use only SVLAN tag 44 (rather than both SVLAN tag 44 and CVLAN tag 42) in conjunction with a constant value, such as 4095.

Management module 60 may configure L2 learning modules 64 in this manner to avoid having any two entries in any one of L2 learning tables 66 be the same. In L2 learning, it is required that no two entries in a L2 learning table be the same as this would suggest that a given MAC address is in two places at once. However, VLANs may span multiple interfaces and learning on only VLAN tags may present instances where more than one entry in L2 learning tables 66 is associated with any given VLAN tag. To avoid this double entry instance, management module 60 configures L2 learning modules 64 in such a way that L2 learning module 64A learns on SVLAN/CVLAN combinations while other ones of interfaces 36 associated with the same VLAN learn on different SVLAN/static value combinations.

Generally, those interfaces that service customers (so-called "customer-facing interfaces," such as interface 34A) perform this form of learning based on both the SVLAN/CVLAN tag combination. Those interfaces that face the core netowrk 10 (so-called "core-facing interfaces" implement form of modified L2 learning that learns based on the SVLAN tag and a static value combination. In this way, the interfaces may avoid creating two or more entries in the L2 learning tables that conflict with one another.

Moreover, given that data plane 54 is ordinarily implemented in fixed logic, such as FPGAs, ASICs and the like, the size of a given L2 learning table entry corresponds to the size of a MAC address, which is 6 bytes. Ordinarily, a VLAN tag, including SVLAN tag 44 and CVLAN tag 42, are only 24 bits. As a result, there is sufficient space to store both the SVLAN tag and CVLAN tag to these 6-byte long entries. While described with respect to this form of modified L2 learning involving combination of SVLAN/CVLAN tags and SVLAN/static value combinations, the techniques may be implemented in any other number of ways. For example, a L2 learning table may store a single entry for each SVLAN tag that references a list of ports or interfaces that have received packets having this SVLAN tag. L2 learning modules 64 may then perform lookups on the corresponding one of L2 learning tables 66 to access this list and determine whether the corresponding one of interfaces 36 that received packet 30A'' is included in the identified list. If not included in the list, this one of L2 learning modules 64A may update the list to include the one of interfaces 36 that received packet 30A''. While there are other ways of implementing this form of modified L2 learning, many of these ways would require significant alterations to the dedicated hardware that forms data plane 54. To avoid these alterations, the techniques may employ SVLAN/CVLAN tag combination and SVLAN/static value combinations so as to adhere to the convention in L2 learning that no two entries may store the same association.

Returning to the example presented above and assuming that L2 learning module 64A has been configured to perform the modified L2 learning techniques described in this disclosure using the SVLAN/CVLAN tag combination above, L2 learning module 64A maintains the corresponding one of L2 learning tables 66 in the manner described above. L2 learning module 64A may then use the SVLAN in conjunction with a static value, such as 4095, to again access the corresponding one of L2 learning tables 66 so as to determine one of interfaces 36 to which to switch packet 30A''. Again, with respect to what would be the destination MAC address lookup in conventional L2 learning, L2 learning module 64A may be configured to perform this destination lookup using the SVLAN tag/static value combination by management module 60, which again configures L2 learning modules 64 in this manner according to configuration data 61.

Assuming the corresponding one of L2 learning tables 66 includes an entry associated with this combination, L2 learning module 64A parses this entry to discover the association stored by this entry. To continue the example described above with respect to FIG. 2A, this entry identifies interface 36B as being associated with this SVLAN tag 44/static value combination. L2 learning module 64A then instructs line card 37A to switch packet 30A'' to line card 37B. Line card 37A then removes NNI label 48 and PW label 44 to form packet 30A''' and switches packet 30A''' to interface 36B. Line card 37B forwards packet 30A''' to SP router 20A via interface 36B, which proceeds as above to remove SVLAN tag 44 and CVLAN tag 42 to form packet 30A'''' before forwarding packet 30A'''' to SP network 12A.

While described above with respect to switching a packet upstream from customer device 22A to SP router 20A, network interface router 16 may perform this form of modified L2 learning in a substantially similar manner to that described above with respect to upstream switching to learn in the downstream direction shown in the example of FIG. 2B. Moreover, while described above with respect to network interface router 16, the techniques may be implemented by any network device capable of performing L2 switching, including aggregation router 14, which as described above may implement various aspects of the modified L2 learning techniques described in this disclosure.

Figure 4:
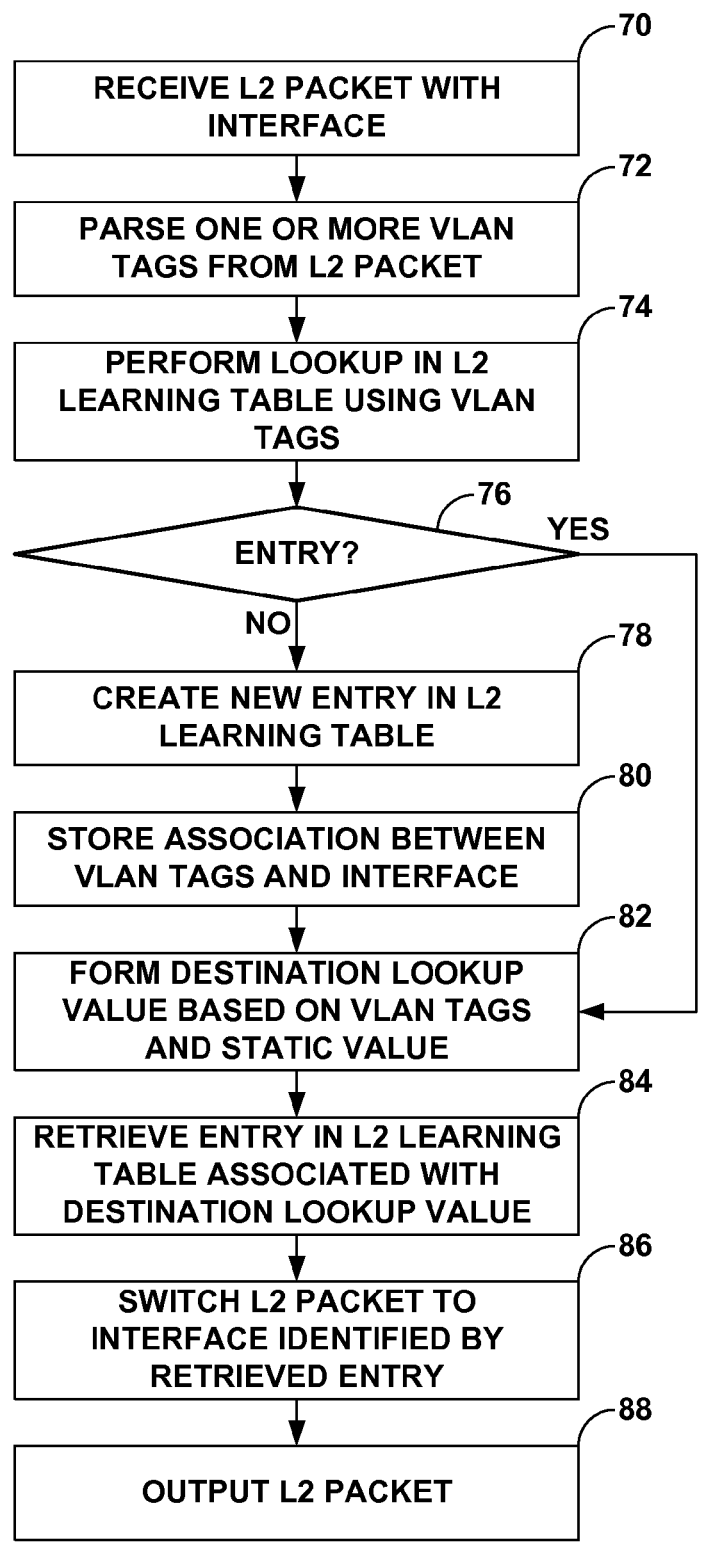
FIG. 4 is a flowchart illustrating exemplary operation of a network device in implementing the modified L2 learning techniques described in this disclosure.

FIG. 4 is a flowchart illustrating exemplary operation of a network device, such as one of aggregation router 14 or network interface router 16, in implementing the modified L2 learning techniques described in this disclosure. While described below with respect to network interface router 16, as shown in the example of FIG. 3, the techniques may be implemented by any network device capable of performing L2 learning.

Initially, interface 36A, as one example, of network interface router 16 receives a L2 packet, such as L2 packet 30A'' shown in the example of FIG. 2A (70). L2 Learning module 64A of line card 37A parses one or more VLAN tags, such as SVLAN tag 44 and CVLAN tag 42, from packet 30A'' (72). Using these VLAN tags 42, 44, L2 learning module 64A performs a lookup in one of L2 learning tables 66 in the manner described above (74). For example, L2 learning module 64A may select one of L2 learning tables 66 based on one or more MPLS labels, such as PW label 46 and/or NNI label 48, parsed from packet 30A". After selecting one of L2 learning tables 66 in this manner, L2 learning module 64A then performs the lookup using one or more of VLAN tags 42, 44 in the manner described above. If the lookup does not return an entry associated with one or more of VLAN tags 42, 44 ("NO" 76), L2 learning module 64A creates a new entry in this corresponding one of L2 learning tables 66 (78). L2 learning module 64A then stores an association between one or more of VLAN tags 42, 44 and interface 36A that received packet 30A" within the newly created entry (80). In this manner, the techniques provide a form of modified L2 learning that network interface router 16 may implement to learn associations between VLANs and interfaces rather than MAC addresses and interfaces.

After creating the new entry or if the lookup returns an entry ("YES" 76), L2 learning module 64A forms what may be referred to as a destination lookup value based on one or more of VLAN tags 42, 44 and a static or defined value (82). This destination lookup value is referred to as a destination lookup value because this lookup mirrors that performed in conventional L2 switching where the switch switches on a destination MAC address. Considering that the modified L2 learning techniques of this disclosure typically only learns associations between VLANs and interfaces, the destination lookup requires that the destination lookup value be formulated using a VLAN tag. In this instance, L2 learning table 64A selects SVLAN tag 44 and creates a destination lookup value by appending a static value to the beginning or end of SVLAN tag 44.

Using this value, L2 learning table 64A retrieves an entry in the corresponding one of L2 learning tables 66 associated with the destination lookup value. As described above, admin 62 often configures or provisioning the corresponding one of L2 learning tables 66 to store an entry associating a given SVLAN tag with a corresponding one of interfaces 36, i.e., interface 36B in this instance. Line card 37A may remove MPLS labels 48, 46 to form packet 30A'" and switches packet 30A'" to interface 36B, which is the interface identified by the retrieved entry in this example. Interface 36B then outputs L2 packet 30A'" to SP router 20A, as described above.

As noted above, the techniques facilitate scalability with respect to L2 learning by learning associations between SVLANs or SVLAN/CVLAN combinations and physical interfaces without needing to learn any associations between MAC addresses and the physical interfaces. The techniques also may reduce configuration requirements as the association between SVLANs and attachment circuits provisioned for PWs is dynamically determined during authentication of a given customer device rather than statically provisioned. Moreover, as opposed to configuring an almost PW for each VLAN, the techniques may require only that a set number of PWs need be provisioned, where this set number equals the number of ISPs times the number of customer-facing aggregation routers. Furthermore, the techniques may mitigate failover and thereby protect other network devices from undergoing a network flap as a result of a network device entering the overload condition.

Various embodiments of the invention have been described. These and other embodiments are within the scope of the following claims.

The invention claimed is:

1. A method comprising:
storing data defining at least one layer two (L2) learning table with an intermediate network device positioned between an aggregation network device and a service provider network device and within a core network that provides wholesale L2 connectivity between customers and a plurality of service providers, wherein the at least one L2 learning table includes entries that are each associated with a service tag that identifies a service virtual local area network (SVLAN) and define an association between interfaces of the intermediate network device and the corresponding service tag without storing an association between an L2 address and the interfaces of the intermediate network device;
receiving a packet from the aggregation network device with one of the interfaces of the intermediate network device, wherein the packet includes an L2 address and a service tag identifying an SVLAN;
accessing the at least one L2 learning table using the service tag included within the received packet to determine whether any one of the entries of the at least one L2 learning table is associated with the service tag included within the received packet without having any association with the L2 address included within the received packet; and
based on the determination that none of the entries of the at least one L2 learning table are associated with the service tag included within the received packet, updating the at least one L2 learning table to create a new entry that is associated with the service tag included within the received packet and define an association between the one of the interfaces of the intermediate network device that received the packet and the service tag included within the received packet without storing an association between a L2 address included within the received packet and the interfaces of the intermediate network device.

2. The method of claim 1, further comprising:
forming a destination lookup value having the same number of bits as the L2 address by combining the service tag included within the received packet and a configured value;
accessing the at least one L2 learning table using the destination lookup value to retrieve one of entries of the at least one L2 learning table associated with the destination lookup value, wherein the retrieved entry identifies one of the interfaces to which the interface that received the packet is to switch the received packet;
switching the received packet to the one of the interfaces identified by the retrieved one of the entries of the at least one L2 learning table; and
outputting the received packet with the one of the interfaces identified by the retrieved one of the entries of the at least one L2 learning table.

3. The method of claim 1,
wherein the intermediate network device and the aggregation network device are configured to communicate with one another via one or more pseudowires (PWs),
wherein each the one or more PWs are associated with one of the plurality of service providers that each provides services to the customers,
wherein the packet includes a PW label identifying one of the one or more PWs,
wherein storing data defining at least one layer two (L2) learning table comprises storing data defining a L2 learning table for each service provider, wherein each of the L2 learning tables is associated with a different PW label, and
wherein accessing the at least one L2 learning table comprises:

parsing the packet to extract the PW label included within the packet;

retrieving one of the L2 learning tables associated with the PW label parsed from the packet; and accessing the retrieved one of the L2 learning tables using the service tag included within the received packet to determine whether any one of the entries of the at least one L2 learning table is associated with the service tag included within the received packet.

4. The method of claim 1, wherein updating the at least one L2 learning table to create a new entry comprises, based on the determination that none of the entries of the at least one L2 learning table are associated with the service tag included within the received packet, updating the at least one L2 learning table to create a new entry that is associated with the service tag included within the received packet and only defines an association between the one of the interfaces of the intermediate network device that received the packet and the service tag included within the received packet without storing any associations between L2 addresses included within the received packet and the one of the interfaces that received the packet.

5. The method of claim 1, further comprising:

receiving a packet from the service provider network device with another one of the interfaces of the intermediate network device, wherein the packet from the service provider network device includes a service tag identifying an SVLAN;

accessing the at least one L2 learning table using the service tag included within the packet from the service provider network device to determine whether any one of the entries of the at least one L2 learning table is associated with the service tag included within the packet from the service provider network device; and based on the determination that none of the entries of the at least one L2 learning table are associated with the service tag included within the packet from the service provider network device, updating the at least one L2 learning table to create a new entry that is associated with the service tag included within the packet from the service provider network device and define an association between the one of the interfaces of the intermediate network device that received the packet from the service provider network device and the service tag included within the packet from the service provider network device without storing an association between a L2 address included within the received packet from the service provider and the interfaces of the intermediate network device.

6. The method of claim 5, wherein the intermediate network device and the aggregation network device are configured to communicate with one another via one or more pseudowires (PWs), wherein each the one or more PWs are associated with one of the plurality of service providers that each provides services to the customers, wherein each of the one or more PWs are identified by a different PW label, wherein storing data defining at least one layer two (L2) learning table comprises storing data defining a L2 learning table for each service provider, wherein each of the L2 learning tables is associated with a different one of the PW labels, wherein the method further comprises:

selecting one of the PWs associated with a service provider that operates the service provider network device from which the packet was received;

inserting one of the PW labels that identifies the selected one of the PWs into the packet from the service provider network device; and outputting the packet from the service provider network device via the selected one of the PWs to the aggregation network device.

7. The method of claim 1, wherein the intermediate network device comprises a router, wherein the aggregation network device comprises an aggregation router, and wherein the service provider network device comprises a service provider router.

8. An intermediate network device positioned between an aggregation network device and a service provider network device and within a core network that provides layer two (L2) wholesale connectivity between customers and a plurality of service providers, the intermediate network device comprising:

a plurality of interfaces; and a control unit that stores data defining at least one L2 learning table, wherein the at least one L2 learning table includes entries that are each associated with a service tag that identifies a service virtual local area network (SVLAN) and define an association between the plurality of interfaces and the corresponding service tag without storing an association between a L2 address and the plurality of interfaces, wherein one of the plurality of interfaces receives a packet from the aggregation network device, wherein the packet includes an L2 address and a service tag identifying an SVLAN, wherein each of the plurality of interfaces is associated with one or more L2 learning modules executing on the intermediate network device, wherein one of the one or more L2 learning modules associated with the one of the plurality of interfaces that received the packet from the aggregation network device accesses the at least one L2 learning table using the service tag included within the received packet to determine whether any one of the entries of the at least one L2 learning table is associated with the service tag included within the received packet without having any association with the L2 address included within the received packet and, based on the determination that none of the entries of the at least one L2 learning table are associated with the service tag included within the received packet, updating the at least one L2 learning table to create a new entry that is associated with the service tag included within the received packet and define an association between the one of the plurality of interfaces of the intermediate network device that received the packet and the service tag included within the received packet without storing an association between a L2 address included within the received packet and the interfaces of the intermediate network device.

9. The intermediate network device of claim 8, wherein the one of the L2 learning modules associated with the one of the plurality of interfaces that received the packet from the aggregation network device further forms a destination lookup value having the same number of bits as the L2 address by combining the service tag included within the received packet and a configured value, accesses the at least one L2 learning table using the destination lookup value to retrieve one of entries of the at least one L2 learning table associated with the destination lookup value, wherein the retrieved entry identifies one of the interfaces to which the interface that received the packet is to switch the received packet, and switches the received packet to the one of the interfaces identified by the retrieved one of the entries of the at least one L2 learning table,
  wherein the identified one of the interface outputs the received packet.
10. The intermediate network device of claim 8,
  wherein the intermediate network device and the aggregation network device are configured to communicate with one another via one or more pseudowires (PWs),
  wherein each the one or more PWs are associated with one of the plurality of service providers that each provides services to the customers,
  wherein the packet includes a PW label identifying one of the one or more PWs,
  wherein the control unit further stores data defining a L2 learning table for each service provider, wherein each of the L2 learning tables is associated with a different PW label, and
  wherein the one of the one or more L2 learning modules associated with the one of the plurality of interfaces that received the packet from the aggregation network further parses the packet to extract the PW label included within the packet, retrieves one of the L2 learning tables associated with the PW label parsed from the packet, and accesses the retrieved one of the L2 learning tables using the service tag included within the received packet to determine whether any one of the entries of the at least one L2 learning table is associated with the service tag included within the received packet.

11. The intermediate network device of claim 8, wherein the one of the L2 learning modules associated with the one of the plurality of interfaces that received the packet from the aggregation network further, based on the determination that none of the entries of the at least one L2 learning table are associated with the service tag included within the received packet, updates the at least one L2 learning table to create a new entry that is associated with the service tag included within the received packet and only defines an association between the one of the interfaces of the intermediate network device that received the packet and the service tag included within the received packet without storing any associations between L2 addresses included within the received packet and the one of the interfaces that received the packet.

12. The intermediate network device of claim 8, wherein another one of the interfaces receives a packet from the service provider network device, wherein the packet from the service provider network device includes a service tag identifying an SVLAN,
  wherein the one of the L2 learning modules associated with the other one of the interfaces accesses the at least one L2 learning table using the service tag included within the packet from the service provider network device to determine whether any one of the entries of the at least one L2 learning table is associated with the service tag included within the packet from the service provider network device and, based on the determination that none of the entries of the at least one L2 learning table are associated with the service tag included within the packet from the service provider network device, updating the at least one L2 learning table to create a new entry that is associated with the service tag included within the packet from the service provider network device and define an association between the one of the interfaces of the intermediate network device that received the packet from the service provider network device and the service tag included within the packet from the service provider network device without storing an association between a L2 address included within the received packet from the service provider and the interfaces of the intermediate network device.

13. The intermediate network device of claim 12, wherein the intermediate network device and the aggregation network device are configured to communicate with one another via one or more pseudowires (PWs),
  wherein each the one or more PWs are associated with one of the plurality of service providers that each provides services to the customers,
  wherein each of the one or more PWs are identified by a different PW label,
  wherein the control unit stores data defining a L2 learning table for each service provider, wherein each of the L2 learning tables is associated with a different one of the PW labels,
  wherein the plurality of interfaces select one of the PWs associated with a service provider that operates the service provider network device from which the packet was received, inserts one of the PW labels that identifies the selected one of the PWs into the packet from the service provider network device and outputs the packet from the service provider network device via the selected one of the PWs to the aggregation network device.

14. The intermediate network device of claim 8,
  wherein the intermediate network device comprises a router,
  wherein the aggregation network device comprises an aggregation router, and
  wherein the service provider network device comprises a service provider router.

15. A non-transitory computer-readable storage medium comprising instruction that cause one or more processors to:
  store data defining at least one layer two (L2) learning table with an intermediate network device positioned between an aggregation network device and a service provider network device and within a core network that provides L2 wholesale connectivity between customers and a plurality of service providers, wherein the at least one L2 learning table includes entries that are each associated with a service tag that identifies a service virtual local area network (SVLAN) and define an association between interfaces of the intermediate network device and the corresponding service tag without storing an association between a L2 address and the interfaces of the intermediate network device;
  receive a packet from the aggregation network device with one of the interfaces of the intermediate network device, wherein the packet includes a L2 address and a service tag identifying an SVLAN;
  access the at least one L2 learning table using the service tag included within the received packet to determine whether any one of the entries of the at least one L2 learning table is associated with the service tag included within the received packet without having any association with the L2 address included within the received packet; and
  based on the determination that none of the entries of the at least one L2 learning table are associated with the service tag included within the received packet, updates the at least one L2 learning table to create a new entry that is associated with the service tag included within the received packet and define an association between the one of the interfaces of the intermediate network device that received the packet and the service tag included within the received packet without storing an association between a L2 address included within the received packet and the interfaces of the intermediate network device.

16. A method comprising:

storing data defining at least one layer two (L2) learning table with an intermediate aggregation network device positioned between an access network device and a layer three (L3) network device and within a core network that provides wholesale L2 connectivity between customers and a plurality of service providers, wherein the at least one L2 learning table includes entries that are each associated with a service tag that identifies a service virtual local area network (SVLAN) and define an association between interfaces of the intermediate aggregation network device and the corresponding service tag without storing an association between a L2 address and the interfaces of the intermediate aggregation network device;

receiving a packet from the access network device network device with one of the interfaces of the intermediate aggregation network device, wherein the packet includes an L2 address and both the service tag identifying an SVLAN and a customer tag identifying a customer virtual local area network (CVLAN);

accessing the at least one L2 learning table using both the service tag and the customer tag to determine whether any one of the entries of the at least one L2 learning table is associated with the service tag and the customer tag included within the received packet without having any association with the L2 address included within the received packet; and based on the determination that none of the entries of the at least one L2 learning table are associated with both the service tag and the customer tag included within the received packet, updating the at least one L2 learning table to create a new entry that is associated with the service tag and the customer tag included within the received packet and define an association between the one of the interfaces of the intermediate aggregation network device that received the packet and the service tag and the customer tag included within the received packet without storing an association between a L2 address included within the received packet and the interfaces of the intermediate network device.

17. The method of claim 16, further comprising:

forming a destination lookup value having the same number of bits as the L2 address by combining the service tag and the customer tag included within the received packet and a configured value;

accessing the at least one L2 learning table using the destination lookup value to retrieve one of entries of the at least one L2 learning table associated with the destination lookup value, wherein the retrieved entry identifies one of the interfaces to which the interface that received the packet is to switch the received packet;

switching the received packet to the one of the interfaces identified by the retrieved one of the entries of the at least one L2 learning table; and outputting the received packet with the one of the interfaces identified by the retrieved one of the entries of the at least one L2 learning table.

18. The method of claim 16, wherein the intermediate aggregation network device and the L3 network device are configured to communicate with one another via one or more pseudowires (PWs), wherein each of the one or more PWs are associated with one of the plurality of service providers that each provides services to the customers, wherein the intermediate aggregation network device couples to an authentication network device, and wherein the method further comprises:

storing data defining a data structure that includes entries, each of which defines an association between a customer tag and one of the one or more PWs;

parsing the packet to extract the customer tag;

accessing the data structure using the extracted customer tag to determine whether one of the one or more PWs has been provisioned for the CVLAN identified by the extracted customer tag;

in response to determining that the one of the one or more PWs has not been provisioned for the CVLAN identified by the extracted customer tag, communicating with the authentication network device to authenticate a customer that originated the packet;

in response to successfully authenticating the customer that originated the packet, receiving provisioning data from the authentication network device that provisions one of the one or more PWs for use by the CVLAN identified by the extracted customer tag;

updating the data structure to create a new entry that stores an association between the provisioned one of the one or more PWs and the extracted customer tag;

appending a PW label to the packet that identifies the packet as corresponding to the provisioned one of the one or more PWs; and outputting the packet with the appended PW label via the provisioned one of the one or more PWs.

19. The method of claim 16, wherein updating the at least one L2 learning table to create a new entry comprises, based on the determination that none of the entries of the at least one L2 learning table are associated with the service tag and the customer tag included within the received packet, updating the at least one L2 learning table to create a new entry that is associated with the service tag and the customer tag included within the received packet and only defines an association between the one of the interfaces of the intermediate aggregation network device that received the packet and the service tag and customer tag included within the received packet without storing any associations between L2 addresses included within the received packet and the one of the interfaces that received the packet.

20. The method of claim 16, further comprising:

receiving a packet from the L3 network device with another one of the interfaces of the intermediate aggregation network device, wherein the packet from the L3 network device includes a service tag identifying an SVLAN and a customer tag identifying a CVLAN;

accessing the at least one L2 learning table using the service tag included within the packet from the L3 network device without using the customer tag included within the packet from the L3 network device to determine whether any one of the entries of the at least one L2 learning table is associated with the service tag included within the packet from the L3 network device; and based on the determination that none of the entries of the at least one L2 learning table are associated with the service tag included within the packet from the L3 network device, updating the at least one L2 learning table to create a new entry that is associated with the service tag included within the packet from the L3 network device and define an association between the one of the interfaces of the intermediate network device that received the packet from the L3 network device and the service tag included within the packet from the L3 network device.

21. The method of claim 20, further comprising:

forming a destination lookup value by combining the service tag included within the received packet and the customer tag included within the received packet;

accessing the at least one L2 learning table using the destination lookup value to retrieve one of entries of the at least one L2 learning table associated with the destination lookup value, wherein the retrieved entry identifies one of the interfaces to which the interface that received the packet is to switch the received packet;

switching the received packet to the one of the interfaces identified by the retrieved one of the entries of the at least one L2 learning table; and outputting the received packet with the one of the interfaces identified by the retrieved one of the entries of the at least one L2 learning table.

22. The method of claim 16, wherein the L3 network device comprises a router, wherein the intermediate aggregation network device comprises an aggregation router, and wherein the access network device comprises a digital subscriber line access multiplexer (DSLAM) network device.

23. An intermediate aggregation network device positioned between an access network device and a layer three (L3) network device and within a core network that provides wholesale layer two (L2) connectivity between customers and a plurality of service providers, the intermediate aggregation network device comprising:

a plurality of interfaces; and a control unit that stores data defining at least one L2 learning table, wherein the at least one L2 learning table includes entries that are each associated with a service tag that identifies a service virtual local area network (SVLAN) and define an association between the plurality of interfaces and the corresponding service tag without storing an association between a L2 address and the plurality of interfaces, wherein one of the plurality of interfaces receives a packet from the access network device, wherein the packet includes an L2 address and both the service tag identifying an SVLAN and a customer tag identifying a customer virtual local area network (CVLAN), wherein each of the interfaces is associated with one or more L2 learning module executed by the intermediate aggregation network device, and wherein one of the L2 learning modules associated with the one of the plurality of interfaces that received the packet from the access network device accesses the at least one L2 learning table using the service tag and the customer tag included within the received packet to determine whether any one of the entries of the at least one L2 learning table is associated with the service tag and the customer tag included within the received packet without having any association with the L2 address included within the received packet and, based on the determination that none of the entries of the at least one L2 learning table are associated with the service tag and the customer tag included within the received packet, updating the at least one L2 learning table to create a new entry that is associated with the service tag and the customer tag included within the received packet and define an association between the one of the interfaces of the intermediate aggregation network device that received the packet and the service tag and the customer tag included within the received packet without storing an association between a L2 address included within the received packet and the interfaces of the intermediate network device.

24. The intermediate aggregation network device of claim 23, wherein the one of the L2 learning modules associated with the one of the plurality of interfaces that received the packet from the access network device forms a destination lookup value having the same number of bits as the L2 address by combining the service tag and the customer tag included within the received packet and a configured value, accesses the at least one L2 learning table using the destination lookup value to retrieve one of entries of the at least one L2 learning table associated with the destination lookup value, wherein the retrieved entry identifies one of the interfaces associated with the one of the plurality of interfaces that received the packet is to switch the received packet and switches the received packet to the one of the interfaces identified by the retrieved one of the entries of the at least one L2 learning table; and wherein the one of the interfaces identified by the retrieved one of the entries of the at least one L2 learning table outputs the received packet.

25. The intermediate aggregation network device of claim 23, wherein the intermediate aggregation network device and the L3 network device are configured to communicate with one another via one or more pseudowires (PWs), wherein each the one or more PWs are associated with one of the plurality of service providers that each provides services to the customers, wherein the intermediate aggregation network device couples to an authentication network device, wherein the control unit stores data defining a data structure that includes entries, each of which defines an association between a customer tag and one of the one or more PWs, and wherein the one of the L2 learning modules associated with the one of the plurality of interfaces that received the packet from the access network device parses the packet to extract the customer tag, accesses the data structure using the extracted customer tag to determine whether one of the one or more PWs has been provisioned for the CVLAN identified by the extracted customer tag, in response to determining that the one of the one or more PWs has not been provisioned for the CVLAN identified by the extracted customer tag, communicates with the authentication network device to authenticate a customer that originated the packet, in response to successfully authenticating the customer that originated the packet, receives provisioning data from the authentication network device that provisions one of the one or more PWs for use by the CVLAN identified by the extracted customer tag, updates the data structure to create a new entry that stores an association between the provisioned one of the one or more PWs and the extracted customer tag, appends a PW label to the packet that identifies the packet as corresponding to the provisioned one of the one or more PWs and outputs the packet with the appended PW label via the provisioned one of the one or more PWs.

26. The intermediate aggregation network device of claim 23, wherein the one of the L2 learning modules associated with the one of the plurality of interfaces that received the packet from the access network device further, based on the determination that none of the entries of the at least one L2 learning table are associated with the service tag included within the received packet, updates the at least one L2 learning table to create a new entry that is associated with the service tag and the customer tag included within the received packet and only defines an association between the one of the interfaces of the intermediate aggregation network device that received the packet and the service tag and customer tag included within the received packet without storing any associations between L2 addresses included within the received packet and the one of the interfaces that received the packet.

27. The intermediate aggregation network device of claim 23,
wherein another one of the interfaces of the intermediate aggregation network device receives a packet from the L3 network device, wherein the packet from the L3 network device includes a service tag identifying an SVLAN and a customer tag identifying a CVLAN, and
wherein one of the L2 learning modules associated with the other one of the interfaces accesses the at least one L2 learning table using the service tag without using the customer tag identifying the CVLAN included within the packet from the L3 network device to determine whether any one of the entries of the at least one L2 learning table is associated with the service tag included within the packet from the L3 network device and, based on the determination that none of the entries of the at least one L2 learning table are associated with the service tag included within the packet from the L3 network device, updates the at least one L2 learning table to create a new entry that is associated with the service tag included within the packet from the L3 network device and define an association between the one of the interfaces of the intermediate network device that received the packet from the L3 network device and the service tag included within the packet from the L3 network device.

28. The intermediate aggregation network device of claim 27, wherein the one of the L2 learning modules associated with the other one of the interfaces forms a destination lookup value by combining the service tag included within the received packet and the customer tag included within the received packet; accesses the at least one L2 learning table using the destination lookup value to retrieve one of entries of the at least one L2 learning table associated with the destination lookup value, wherein the retrieved entry identifies one of the interfaces to which the interface that received the packet is to switch the received packet, switches the received packet to the one of the interfaces identified by the retrieved one of the entries of the at least one L2 learning table; and outputs the received packet with the one of the interfaces identified by the retrieved one of the entries of the at least one L2 learning table.

29. The intermediate aggregation network device of claim 23,
wherein the L3 network device comprises a router,
wherein the intermediate aggregation network device comprises an aggregation router, and
wherein the access network device comprises a digital subscriber line access multiplexer (DSLAM) network device.

30. A non-transitory computer-readable medium comprising instructions that cause one or more processors to:
store data defining at least one layer two (L2) learning table with an intermediate aggregation network device positioned between an access network device and a layer three (L3) network device and within a core network that provides L2 wholesale connectivity between customers and a plurality of service providers, wherein the at least one L2 learning table includes entries that are each associated with a service tag that identifies a service virtual local area network (SVLAN) and define an association between interfaces of the intermediate aggregation network device and the corresponding service tag without storing an association between a L2 address and the interfaces of the intermediate aggregation network device;
receive a packet from the access network device network device with one of the interfaces of the intermediate aggregation network device, wherein the packet includes an L2 address and both the service tag identifying an SVLAN and a customer tag identifying a customer virtual local area network (CVLAN);
access the at least one L2 learning table using both the service tag and the customer tag to determine whether any one of the entries of the at least one L2 learning table is associated with the service tag and the customer tag included within the received packet without having any association with the L2 address included within the received packet; and
based on the determination that none of the entries of the at least one L2 learning table are associated with both the service tag and the customer tag included within the received packet, update the at least one L2 learning table to create a new entry that is associated with the service tag and the customer tag included within the received packet and define an association between the one of the interfaces of the intermediate aggregation network device that received the packet and the service tag and the customer tag included within the received packet without storing an association between a L2 address included within the received packet and the interfaces of the intermediate network device.

31. A network system comprising:
a customer virtual local area network (CVLAN) that includes at least one customer network device, wherein the CVLAN is identified by a customer tag;
a service virtual local area network (SVLAN) that includes an access network device, wherein the SVLAN is identified by a service tag;
a core network that that provides layer two (L2) wholesale connectivity between customers and a plurality of service providers and that includes:
an aggregation router; and
a router; and
at least one service provider network that includes a service provider router,
wherein the router is positioned intermediately between the service provider router and the aggregation router,
wherein the router includes:
a plurality of interfaces; and
a control unit that stores data defining at least one layer two (L2) learning table, wherein the at least one L2 learning table includes entries that are each associated with a service tag that identifies an SVLAN and define an association between interfaces of the intermediate network device and the corresponding service tag without storing an association between a L2 address and the plurality of interfaces, wherein one of the plurality of interfaces receives a packet from the aggregation router, wherein the packet includes an L2 address and the service tag identifying the SVLAN, wherein each of the interfaces is associated with one or more L2 learning modules, and wherein one of the L2 learning modules associated with the one of the plurality of interfaces that received the packet from the aggregation router accesses the at least one L2 learning table using the service tag included within the received packet to determine whether any one of the entries of the at least one L2 learning table is associated with the service tag included within the received packet without having any association with the L2 address included within the received packet and, based on the determination that none of the entries of the at least one L2 learning table are associated with the service tag included within the received packet, updating the at least one L2 learning table to create a new entry that is associated with the service tag included within the received packet and define an association between the one of the interfaces of the router that received the packet and the service tag included within the received packet without storing an association between a L2 address included within the received packet and the interfaces of the intermediate network device.

32. A network system comprising:

a customer virtual local area network (CVLAN) that includes at least one customer network device, wherein the CVLAN is identified by a customer tag;

a service virtual local area network (SVLAN) that includes an access network device, wherein the SVLAN is identified by a service tag;

a core network that provides layer two (L2) wholesale connectivity between customers and a plurality of service providers and that includes:

an aggregation router; and a router; and at least one service provider network that includes a service provider router, wherein the aggregation router is intermediately positioned between the access network device and the router, wherein the aggregation router comprises:

a plurality of interfaces; and a control unit that stores data defining at least one L2 learning table, wherein the at least one L2 learning table includes entries that are each associated with a service tag that identifies a SVLAN and a customer tag that identifies a CVLAN and define an association between the plurality of interfaces and the corresponding service tag without storing an association between a L2 address and the plurality of interfaces, wherein one of the plurality of interfaces receives a packet from the access network device, wherein the packet includes an L2 address and both the service tag identifying an SVLAN and a customer tag identifying a CVLAN, wherein each of the interfaces is associated with one or more L2 learning module executed by the intermediate aggregation network device, and wherein one of the L2 learning modules associated with the one of the plurality of interfaces that received the packet from the access network device accesses the at least one L2 learning table using the service tag and the customer tag included within the received packet to determine whether any one of the entries of the at least one L2 learning table is associated with the service tag and the customer tag included within the received packet without having any association with the L2 address included within the received packet and, based on the determination that none of the entries of the at least one L2 learning table are associated with the service tag and the customer tag included within the received packet, updating the at least one L2 learning table to create a new entry that is associated with the service tag and the customer tag included within the received packet and define an association between the one of the interfaces of the intermediate aggregation network device that received the packet and the service tag and the customer tag included within the received packet without storing an association between a L2 address included within the received packet and the interfaces of the intermediate network device.

* * * * *